United States Patent
Schroeder

(10) Patent No.: US 8,013,837 B1
(45) Date of Patent: Sep. 6, 2011

(54) PROCESS AND APPARATUS FOR PROVIDING A ONE-DIMENSIONAL COMPUTER INPUT INTERFACE ALLOWING MOVEMENT IN ONE OR TWO DIRECTIONS TO CONDUCT POINTER OPERATIONS USUALLY PERFORMED WITH A MOUSE AND CHARACTER INPUT USUALLY PERFORMED WITH A KEYBOARD

(76) Inventor: James Ernest Schroeder, Helotes, TX (US)

( * ) Notice: Subject to any disclaimer, the term of this patent is extended or adjusted under 35 U.S.C. 154(b) by 1313 days.

(21) Appl. No.: 11/248,944

(22) Filed: Oct. 11, 2005

(51) Int. Cl.
*G09G 5/08* (2006.01)

(52) U.S. Cl. .................................. 345/157; 715/865

(58) Field of Classification Search .................. 345/156, 345/157, 163–168; 715/857, 865, 835; 341/21; 340/825.19
See application file for complete search history.

(56) References Cited

U.S. PATENT DOCUMENTS

| | | | | |
|---|---|---|---|---|
| 4,746,913 A | * | 5/1988 | Volta | 345/157 |
| 5,565,887 A | * | 10/1996 | McCambridge et al. | 345/157 |
| 5,929,840 A | * | 7/1999 | Brewer et al. | 345/159 |
| 5,963,195 A | * | 10/1999 | Gregg et al. | 345/163 |
| 6,133,905 A | * | 10/2000 | Edo et al. | 345/156 |
| 6,613,000 B1 | * | 9/2003 | Reinkensmeyer et al. | 600/587 |
| 6,795,055 B1 | * | 9/2004 | Culler | 345/157 |
| 2002/0158920 A1 | * | 10/2002 | Abrams | 345/856 |
| 2005/0025290 A1 | * | 2/2005 | Doherty et al. | 379/52 |
| 2005/0195166 A1 | * | 9/2005 | Cooper et al. | 345/161 |
| 2006/0026537 A1 | * | 2/2006 | L'Heureux | 345/157 |

* cited by examiner

*Primary Examiner* — Chanh Nguyen
*Assistant Examiner* — Allison Walthall

(57) ABSTRACT

The apparatus and method help physically-disabled persons perform point-and-click activities or input text or control characters, which typically require the user to simultaneously control two independent dimensions to select options presented on a computer display. Computer users operate a control in a single dimension (i.e., two directions—first embodiment) or in just one direction (second embodiment). Different input strategies allow a person using the one- or two-directional control method to emulate pointer functions and input characters or character strings. An embodiment augments antagonistic muscle groups for persons exhibiting adequate control in one direction but not the other. An additional embodiment uses available two-dimensional pointers but restricts their operation to one dimension. The output of existing sensors is converted to a form that can be input directly to a computer to be used with a one-dimensional control strategy.

36 Claims, 8 Drawing Sheets

Frame 1
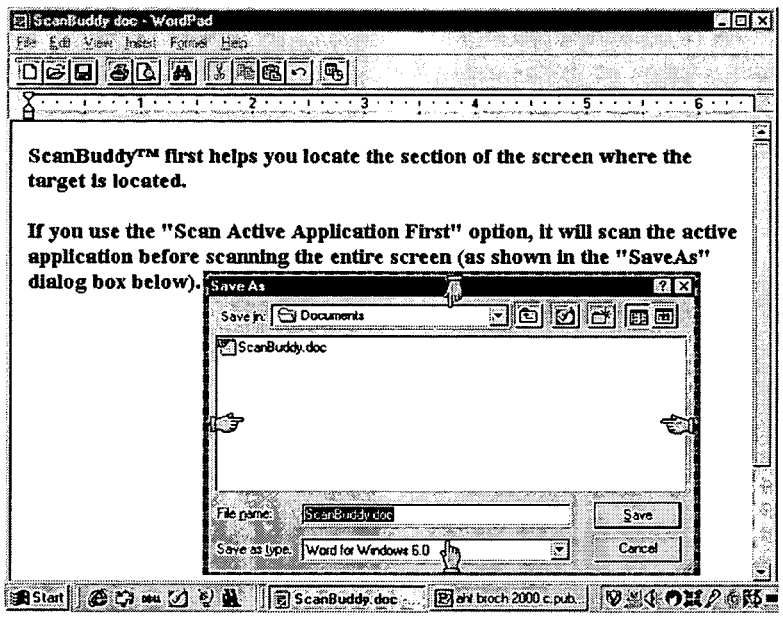
⋮
Frame 2
Once the section is located, ScanBuddy™ uses line scanning to let you select the exact vertical . . . (using a line)
and horizontal location where you want to click (using a pointing hand).
Frame 3
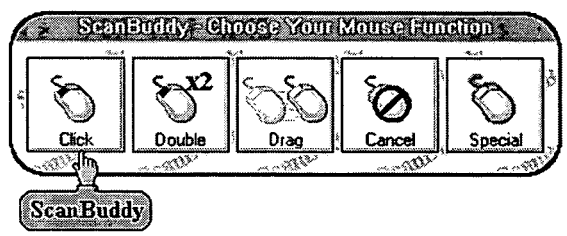
Figure 1 (Prior Art – Mouse Emulator)

Frame 1:
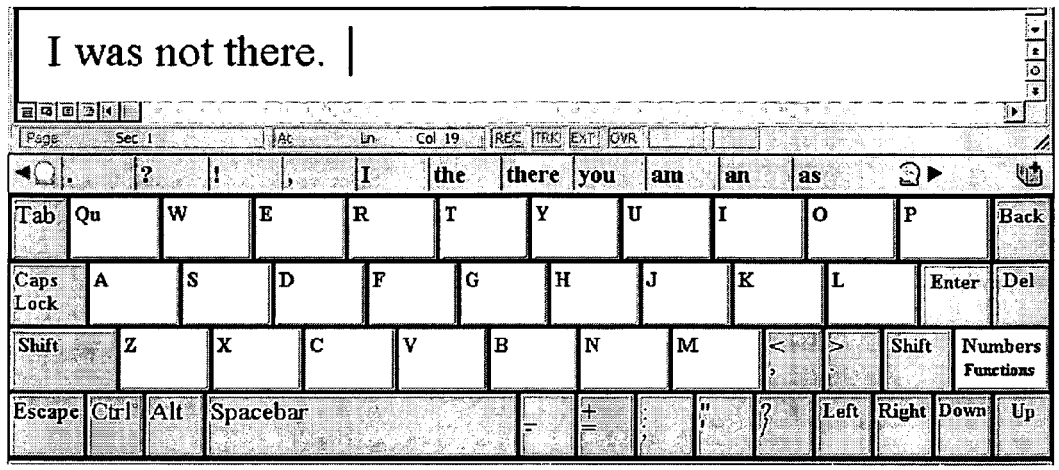
Frame 2:
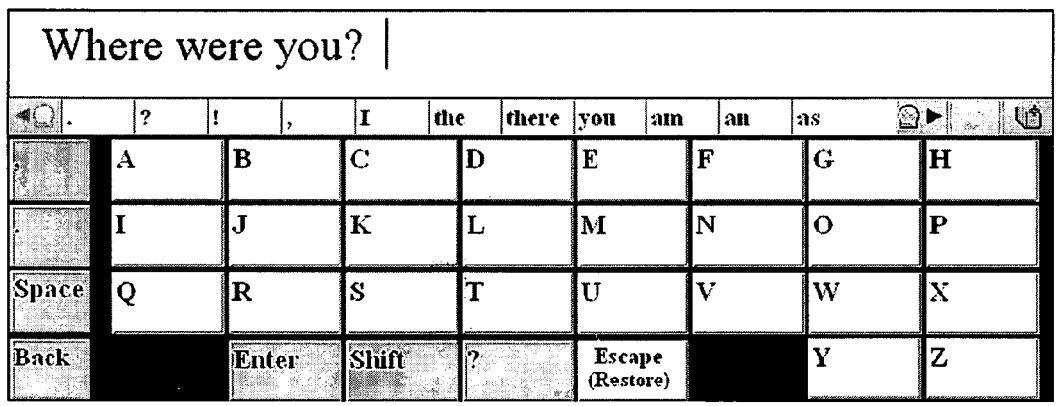
Figure 2 (Prior Art – On-Screen Keyboards)

Frame 1:

| Tab | Qu | W | E | R | T | Y | U | I | O | P | Back |
|---|---|---|---|---|---|---|---|---|---|---|---|
| Caps Lock | A | S | D | F | G | H | J | K | L | Enter | Del |
| Shift | Z | X | C | V | B | N | M | < , | > . | Shift | Numbers Functions |
| Escape | Ctrl | Alt | Spacebar | | - | += | :; | "' | ?/ | Left | Right | Down | Up |

*(Top row highlighted)*

Frame 2:

*(Second row "Caps Lock ... Del" highlighted)*

Frame 3:

*(Caps Lock key highlighted)*

Frame 4:

*(A key highlighted)*

Figure 3. (Prior Art – Row/Column Scanning)

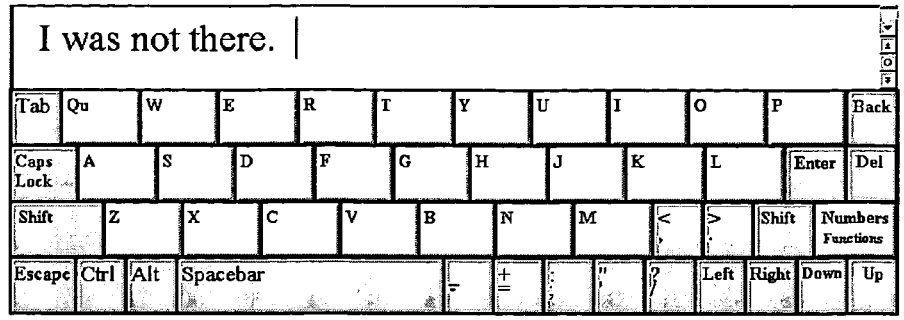
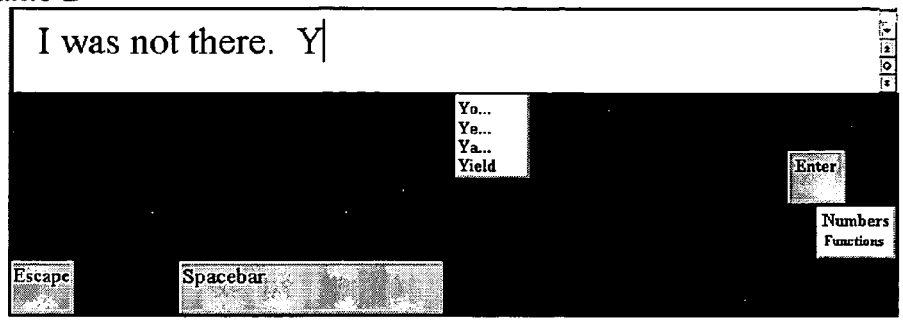
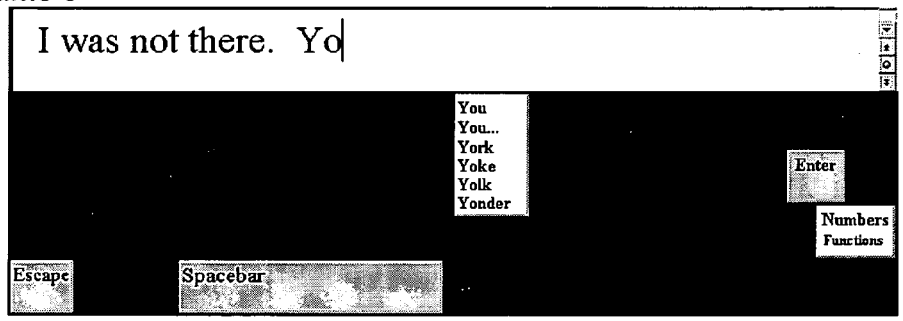
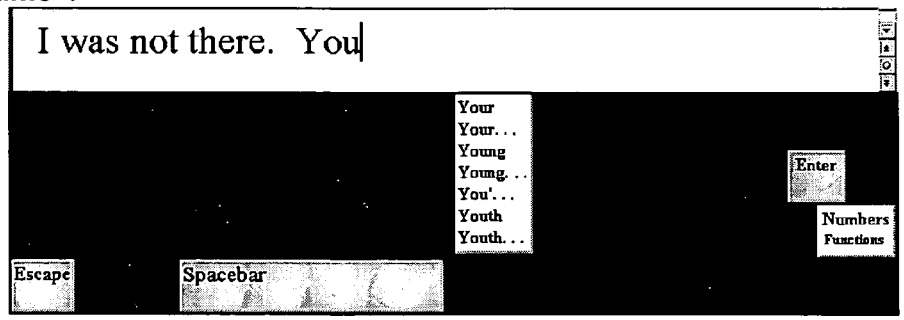
Figure 4 (Related Patent-Pending Technology)

Frame 1
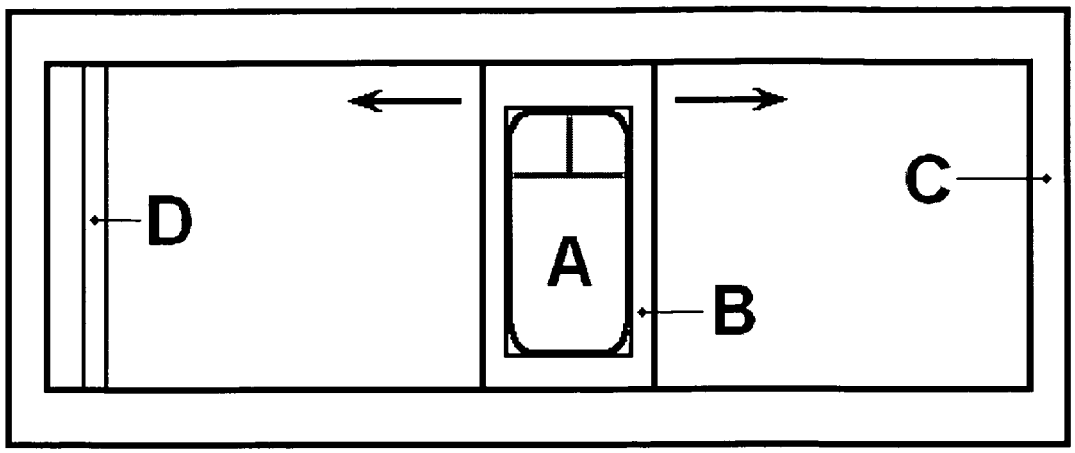
Frame 2
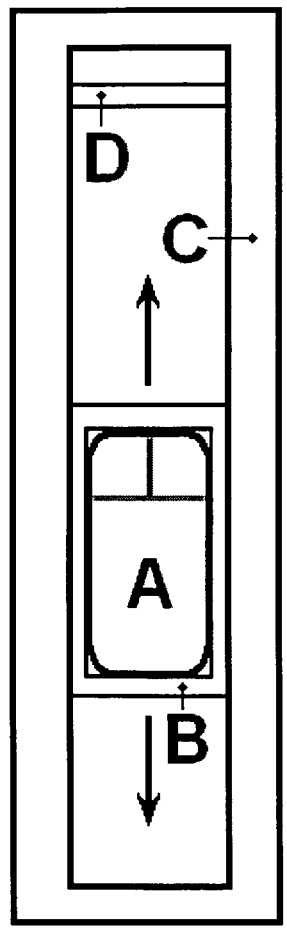
Frame 3
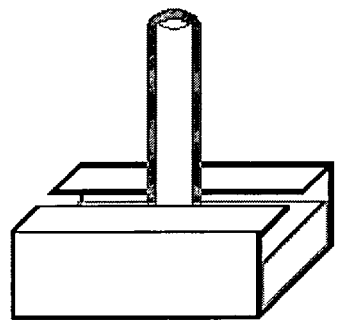
Frame 4
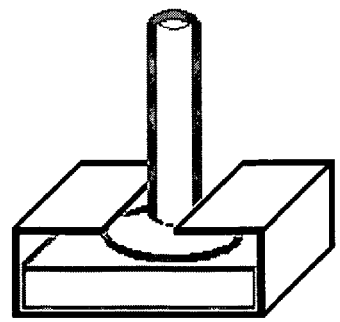
Figure 5

PROCESS AND APPARATUS FOR PROVIDING A ONE-DIMENSIONAL COMPUTER INPUT INTERFACE ALLOWING MOVEMENT IN ONE OR TWO DIRECTIONS TO CONDUCT POINTER OPERATIONS USUALLY PERFORMED WITH A MOUSE AND CHARACTER INPUT USUALLY PERFORMED WITH A KEYBOARD

STATEMENT REGARDING FEDERALLY SPONSORED RESEARCH OR DEVELOPMENT

This invention was made with government support under SBIR Grant #1 R43 HD046176-01A1 awarded by the National Institute of Child Health and Human Development. The government has certain rights in the invention.

BACKGROUND OF THE INVENTION

This invention relates generally to the field of computer input and more particularly to a process for increasing the speed and accuracy of computer input for persons who have difficulty using, cannot use, or choose not to use a standard computer pointing device (e.g., mouse) or character input device (e.g., keyboard). The invention is further related to the field of assistive technology as a process for improving physically disabled persons' access to computers as well as improving their speed and accuracy. The invention is further related to modifying existing switches or creating new switches which provide a mechanism for converting a non-dichotomous user response (e.g., pressure; muscle activity; voice volume; distance moved; electrophysiological action such as that measured by electromyography, electro-oculography, or electroencephalography, etc.; proximity to a sensor; point of gaze; etc.) from a standard dichotomous output (on/off) to a digital or analog monotonically increasing or decreasing output. The invention also is related to an apparatus that assists users who have adequate control in one direction of one dimension (e.g., moving a mouse to the left) but who have poor control of the antagonistic muscle groups performing movement in the opposite direction (e.g., moving the mouse to the right), by providing a counterforce to augment movement in the opposite direction. The invention is further related to providing a diagnostic tool to help in a clinical or research setting to determine which user response is the best candidate, which switch/controller is the best candidate, which combination of response and switch/controller is best, etc.

Although not limited to pointer input device emulation and text entry, the simplest form of the invention is most easily understood in the context of standard computer input and control such as using a mouse pointer to point and click on an option presented on a computer display or typing to a word processing program. Consequently, the following general discussion uses the examples of pointing and clicking on a screen location and typing words into a word processing application as the general context in which the invention is described. Also, although not limited to use by the physically disabled community (e.g., a soldier or driver who cannot divert gaze to a standard two-dimensional screen and perform conventional selection tasks could benefit from this invention), the following discussion uses the general example of increasing computer access for a physically-disabled computer user as the general context because the use of the invention is more easily understood in that setting and the potential advantages are more obvious.

The invention described here builds on current knowledge of general computer input technology. Six specific such technologies are described here because of their relevance for the invention: pointer-input technology, mouse-emulation technology, on-screen keyboard technology, "scanning" keyboard technology, list-based typing, and control device technology.

Background on Pointer-Input Technology. Over the past 20 years, the use of a "mouse" pointer as an input device for a computer has become so ubiquitous that many people would assume it has always been one of the primary input devices. Although the best known, the mouse is just one of a family of many possible "pointers" that can be used with today's computer. Other more well-known members of this family include the trackball, joystick, touch screen, touch pad, and graphics tablet. For all such pointers, the basic underlying response requirements for a user usually are the same: 1) identify a specific location on a two-dimensional computer display (i.e., "point" by positioning the mouse cursor on the desired target), and 2) signal a selection or other instruction (e.g., click, double click, drag, etc.).

For a variety of reasons, more conventional pointers might not work for some users or for any user in some situations. The most intuitive example is a physically disabled person who does not have the hand/arm dexterity to use a conventional pointer. As a result, innovative new pointers have emerged which attempt to exploit the capabilities of such users. For example, sophisticated (and expensive) pointer systems based on head movements and point of gaze are commercially available. There even have been reports of successful attempts to use measures of brain activity as a mechanism for positioning a mouse cursor. Another existing and less expensive technological approach is based on identifying a single response that the user can perform reliably and using that single dichotomous switch action to direct the location (e.g., point) and select (e.g., click), usually accomplished by using the mouse. This general approach has been called "mouse emulation" and the corresponding hardware/software approaches used are called "mouse emulators."

Background on Mouse-Emulation Technology. Although different approaches can be taken for emulating a mouse, the discussion here is limited to an approach that is commonly used by persons with physical disabilities called "scanning" or "switch scanning." Even though a person might lack the ability to precisely use a conventional mouse, a single response often can be identified which the user can perform reliably (e.g., blink an eye, move the thumb, puff into a straw, etc.). In single-switch scanning approaches, the user typically performs such a response to signal selection of an option that has been presented by the computer. While there are several commercial products available, the example used here is an existing product of Applied Human Factors, Inc. (AHF) called "ScanBuddy," which is representative of such products.

Mouse emulation programs allow a user to perform most mouse functions with a single switch. As with any pointer, the two major tasks are to identify a location on the display and then instruct the computer what to do at that site. To identify the point, the user initially operates the switch to begin the program (depending on the adaptation, operating the switch might mean blinking an eye, puffing on a tube, touching a contact switch, etc.). At that time a rectangle is drawn surrounding the top half of the display. If the target point is inside that rectangle, the user clicks the switch; if it is not, the user waits for the (adjustable) time period to pass at which time a rectangle is drawn around the bottom half of the display. Once the correct section of the display is selected, then the selected rectangle is divided in half and the two new sections offered to the user one at a time. In the current example, if the user initially selects the bottom half of the display, then the left half of that section (quarter) is offered. Again, if the target is in that rectangle, the user clicks the switch and if not, the user waits for the other (right) half to be offered. Alternatively, if the mouse emulation software detects that the user last clicked inside a dialog box, it can offer the dialog box first before offering the entire display (as shown in Frame 1 of FIG. 1). AHF calls this method "section scanning," and this is the only product that uses this method (as far as AHF can determine). It is intended to provide a fairly quick way for a user to identify the general location (section) of the display that contains the target. AHF determined that, while this method is useful to rule out a large portion of the display, it is not efficient as a way of selecting the target point (in fact, while users can adjust how many section divisions are offered, the mouse emulation software limits the number to five or less).

Once the section has been determined, the scanning method changes to "line scanning," a method that is used in other existing products (for the entire display—not for a selected section). Specifically, a horizontal line is presented at the top of the final section and moves downward at an adjustable speed. The user's task is to operate the switch when it crosses the targeted point (hence, establishing the vertical location of the target point). Then, an icon showing a pointing hand is moved horizontally along that line from left to right, and the user's task is to click the switch when the finger points to the target location. See Frame 2 of FIG. 1 for graphic representations of vertical (top) and horizontal (bottom) line scanning. Because the speed of the scanning lines can be set to complement the ability of the user, line scanning provides considerable accuracy when selecting a point on the display. However, line scanning alone can be very slow if the target is in the opposite corner from where the lines begin. Hence, this combination of section and line scanning was introduced as a way of increasing speed while retaining accuracy.

At this point, the user has accomplished the first task (point) and now must provide the instruction about what action should be taken at this point (click, double click, etc.). Here, ScanBuddy again is representative of existing products, offering a scanning menu containing click, double click, drag, cancel, and special (see Frame 3 of FIG. 1). If the "special" option is selected, another scanning menu appears containing right (right mouse button), scroll, shift+ (e.g., hold the shift key down while dragging), control+ (e.g., hold the control key down while clicking), pulse click, favorite (launch a selected application), and settings. Hence, most of the mouse functions that can be performed with a regular mouse can be performed by a person using a single switch with a mouse emulator. The problem is speed, no matter how clever a mouse emulation program is, it is hard to imagine that one could ever approach the speed of a non-disabled person using a standard pointer.

Background for On-Screen Keyboard Technology. Traditionally, the hardware keyboard has been the standard input mechanism for typing when using a computer. However, many people (e.g., persons with disabilities, children, new typists, or infrequent typists) can experience difficulty using hardware keyboards for a variety of reasons such as poor dexterity or unfamiliarity with the keyboard layout. One existing technology that can be useful is the on-screen keyboard. In this approach users are provided a graphic representation of a keyboard on the computer's display. Using a "point-and-click" input mode, a mouse or other pointer is used to type letters by clicking on the graphically displayed keys or by touching them with a finger or a stylus when a touch screen is available. When selected, the appropriate character typically is sent to a word processor, spread sheet, database, or some other open application. On-screen keyboards can be useful because the keys can be presented in a more meaningful way (e.g., an alphabetic layout instead of the traditional "QWERTY" layout), which can be easier to use for some people. Also, with an on-screen keyboard the names of the letters can be spoken (with synthesized or recorded speech) when they are selected which also can be useful for some people. In addition, pictures can be added to a key's face, and this can be helpful (e.g., a picture of an "apple" on the "A" key). Finally, useful information can be presented when a key is "pointed at" with the pointer. For example, when a user points at the key with the label "A," the key's appearance can change; a picture of an "apple" might appear, a new label "A as in Apple" might appear and be read aloud. All of these features can be especially useful to a person with spelling, reading, or writing learning difficulties. FIG. 2 shows representative examples of a traditional "QWERTY" keyboard in Frame 1 and an example of an "Alphabetic" keyboard in Frame 2. Some people are unable to use a traditional hardware keyboard because of a physical disability. If they are able to use a pointer, then on-screen keyboards provide a very important access tool. Similarly, some persons have a more severe physical disability and for them, other strategies must be applied such as "switch scanning" techniques.

Background on "Scanning" Keyboard Technology. The third technology deals with "switch scanning input methods". While the point-and-click input mode is the best approach for many users, some people cannot use a standard keyboard or a standard pointing device. However, for most such individuals, some reliable single response usually can be identified and used to make a selection with a switch. Switches are available to capture a variety of responses more likely to be under the user's control such as the eye blink response, air puff or air sip response, etc. The single switch then can be used to select options being offered on the display such as keys being "offered" on an on-screen keyboard. Such "scanning keyboards" allow the output from a simple switch to signal the selection of a group of keys or individual key being offered.

In one existing method called single-switch scanning, an on-screen keyboard offers different options at a constant rate, for example, every 2 sec. Typically, the user first selects the "row" that contains the target letter and then selects the "column" or key, hence, this approach is called "Row/Column Scanning." This method is illustrated in FIG. 3. In Frame 1, the top row of keys (i.e., containing Tab, Qu, W, E, R, etc.) is first "highlighted" (e.g., its color changed, a box drawn around it, etc.), for the pre-established time period. Next, the second row is offered to the user, again by highlighting, as shown in Frame 2. In this example, the user is typing the letter "A," so the second row is selected by the user through the use of the switch. Next, the columns (i.e., keys) in that row are systematically highlighted from left to right—as shown in Frames 3 and 4. The user selects the correct key by operating the switch when the target key is highlighted, in this example, when the "A" key is highlighted as in Frame 4. At that point, the key is typed and the character is sent to the open software application. Scanning then is reset so the user can type the next letter. Although tediously slow, scanning is the only typing alternative for many users.

Background on List-Based Typing. Recently, innovative new procedures for increasing typing speed and accuracy have been created. One that is especially relevant for the present invention is labeled "list-based typing," and was submitted as a patent application on Oct. 15, 2002 (A process for integrating visual, cognitive, and motor tasks during typing and character string entry: jc930 U.S. Ser. No. 10/271,419) and is still being evaluated at the time this application was submitted. When using list-based typing, the first letter is selected from an on-screen keyboard (as shown in Frame 1 of FIG. 4). In this example, the user is typing the word "your." When the initial "y" key is selected (either by pointing and clicking or by scanning), that key opens up showing a list of options (as shown in Frame 2). Each option contains the current "Root" (the letter(s) already inputted) and a candidate "Extension" (letter or letters known to follow the Root based on words in the dictionaries currently opened). The user's task is to select the option that is most consistent with the beginning of the word being typed, so in this case, the "Yo . . . " option is selected, resulting in another list of options as shown in Frame 3. Selection of the "You . . . " option in Frame 3 produces the list shown in Frame 4, which contains the target word "Your." There are several advantages to this approach, but the most significant benefits are for persons using scanning. For example, only one switch operation is required per selection (compared with two for traditional row/column scanning), so "work" is cut in half once a list is introduced. Also, speed is increased because the options are ordered by their probability (as shown in FIG. 4). However, options also can be ordered alphabetically, which is perhaps more appropriate for persons using point-and-click input. The most important aspect of List-Based Typing for the present invention is that options are presented in a one-dimensional list format.

Background on Control Device Technology. Control devices can be characterized by the user's behavior required to operate the device (Input); the nature, form, and function of the resulting output (Output), and the internal mechanism(s) that sense and transduce the user's behavior to the final output (Sensor/Transducer). For the purpose of this discussion, two general categories of computer interface input controls are identified to provide a frame of reference and a third type is offered/described because it is as an important component in the invention.

Pointers compose the first general category of control device to be discussed here. As introduced above, there are a variety of pointers available ranging from the standard mouse to more complex eye-tracking systems. As a group they vary widely with regard to the Input required from the user as well as the Sensor/Transducer utilized to characterize the user's Input. However, with regard to functional Output they all are very similar, that is, they result in the movement of a mouse cursor in two dimensions independently on a computer's two-dimensional display.

Switches compose the second general category of control device discussed here. Dozens of simple switches with dichotomous output are incorporated on every computer hardware keyboard. Also, as discussed above, switches with dichotomous Output are exploited in assistive technology in "scanning" approaches used for emulating a pointer (see the mouse-emulation section above) and for inputting text or other keyboard commands (see the scanning-keyboard section above). As with pointers, their Input might vary significantly (e.g., contact pressure, proximity, movement, a vacuum, air pressure, sound, electrophysiological activity, etc.). Also similar to pointers, the Sensor/Transducers can vary widely depending on the Input characteristics. However, as with pointers, they all have a similar (but different from pointers) Output characteristic: a dichotomous on/off state that usually is then interpreted by the computer based on hardware or software "instructions" as a "selection" of a computer action.

The invention described here utilizes a third type of control device as the critical component. This type of control certainly is not new or novel and significantly predates pointer controls. While providing less control information than conventional pointers, it is capable of generating significantly more control information than a conventional switch. Specifically, the control device relevant for this invention allows user Input in one dimension rather than two. In such a control, some measurable dimension of user Input is sensed/transduced to some monotonically related Output measure. Common examples include a gas pedal, brake pedal, steering wheel, dimmer switch for an overhead light, etc. Indeed, a computer pointer can be conceptualized as two integrated orthogonal one-dimensional controls (although pointers actually are more complex because they meaningfully consolidate simultaneous Input from two independent Input dimensions). Such switches sometimes are labeled as proportional controls in the literature.

Three important points should be made regarding the relationship between the invention and one-dimensional controls. First, while one-dimensional controls are very common in general, they are very uncommon as commercial computer controls. The exceptions are custom game interfaces in which, for example, a steering wheel or gas pedal are parts of a game or simulation. Second, through software modification, an ordinarily two-dimensional pointer can be modified so that the resultant control is one-dimensional, and while that doesn't usually seem like a useful approach, it is an important characteristic that is exploited with this invention. Third, while many existing custom switches designed for assistive technology applications have been created in a way that the eventual Output is a dichotomous switch closure (in order to allow a physically-disabled person use a scanning approach—as described above), many could be modified to be one-dimensional controls (i.e., by exploiting the underlying non-dichotomous output from the transducer before it is converted to a dichotomous Output). Part of the invention is an apparatus that captures the more basic output from existing sensor products and transforms it into an output that is compatible with the input standards and conventions required for standard computer pointers.

Statement of the Problem: There is a Need to Help Persons with Mobility Disabilities to Interact Faster and More Accurately with Computers without Having to Rely on Very Slow Single-Switch Scanning Techniques.

The transition from card, tape, and keyboard-based computer input/control mode to a two-dimensional (2-D) graphic user interface control mode (e.g., the mouse, joystick, trackball, etc.), was one of the most significant innovations in the evolution of computer interface technology. However, the change from keyboard-based "control keys" to tasks involving locating a cursor by controlling its location in two independent dimensions and then using a switch to signal selection (i.e., pointing and clicking) was not a very useable improvement for persons with physical disabilities. Within the field of assistive technology, the general strategies adopted were to attempt to help the physically-disabled user adapt to conventional 2-D pointers, create custom 2-D pointers based on some behavior more likely to be controllable by such users (e.g., eye-gaze systems), or emulate 2-D pointers using switches combined with scanning techniques, which are extremely slow, tedious, and boring alternatives. Clearly there is a need for improved methods/technology to make computer access (i.e., mouse emulation and character input) faster and less tedious for persons with physical disabilities.

When the primary control mechanism for personal computers shifted in one step to an on-screen, two-dimensional control strategy, it is possible that a potentially useful control strategy was literally skipped over. Specifically, it is likely that subpopulations of users exist who have adequate control in one dimension but who do not have adequate control in two independent dimensions simultaneously. There is evidence in the literature to support this assertion, that is, that some people might benefit by operating a one-dimensional control devised in a way that emulates a standard computer pointer and a hardware keyboard.

Methods are needed which allow a person to have improved computer access, input, and control by using a one-dimensional control device. The "one-dimensional interface" process described herein is such a process in which the user operates a control mechanism based on changes in behavior measured in one dimension. Also, such a one-dimensional approach can be modified to further exploit the capability of a specific user by providing two-directional control along that single dimension found to produce the most accurate control for that person (e.g., a specific user might have more control when moving an arm left and right compared to up and down). Hence, in this application the term "One-Dimensional Control" is used to represent the general approach of limiting control to one dimension and the term "Two-Directional Control" is a special case in which changes in both directions impact corresponding changes on the computer's display.

In addition, there are studies in the literature showing that some individuals have more control in one direction along a single dimension than in the opposite direction (e.g., a person might be able to move an arm to the left faster and more accurately than moving it to the right). This is not surprising because antagonistic muscle groups are involved and control of a muscle group that results in more controlled movement in one direction does not necessarily mean that the antagonistic muscle group is equally well controlled. Hence, another form of the invention is labeled a "One-Directional Control" because in that method, changes in only one direction of a single dimension are used to produce corresponding changes on the computer's display. Hence, for the person described above, only arm movement to the left is used to determine the cursor's position (when emulating a mouse) or character selection (when emulating keyboard input). In addition, for such users there is a need for an apparatus to augment the performance of the antagonistic muscle groups, in this example the apparatus provides a counterforce to help the user return the arm to the starting position. Also, because of the diverse preferences among users with regard to what approach is the most useful for them, different specific methods and strategies are needed for both mouse and keyboard emulation. Methods also are needed to allow such an interface to accommodate input from standard existing pointer controls as well as new methods to modify existing controls and create new controls to capture a user's behavioral responses in one dimension. Finally, methods are needed to assess the usefulness of both Two-Directional and One-Directional control methods relative to other possible methods, as well as assess different candidate user behaviors, control devices, settings (speed, direction, gain, etc.), interface strategies, etc., with the goal of selecting or recommending the best input strategy and maximizing that user's performance.

BRIEF SUMMARY OF THE INVENTION

One primary object of the invention is to increase the speed and accuracy of pointing and clicking on various specific locations on a computer display (as usually accomplished with a mouse or other pointer device) and increasing the speed and accuracy of inputting letters, numbers, or other characters/commands (as usually accomplished with a hardware or on-screen keyboard) by allowing the user to operate a control that is operated in one dimension (two directions) instead of two dimensions simultaneously.

The second primary object of the invention is to increase the speed and accuracy of pointing and clicking on various specific locations on a computer display (as usually accomplished with a mouse or other pointer device) and increasing the speed and accuracy of inputting letters, numbers, or other characters/commands (as usually accomplished with a hardware or on-screen keyboard) by allowing the user to operate a control that is operated in one dimension (one direction) instead of two dimensions simultaneously.

Another object of the invention is to provide a variety of complementary software one-dimensional interface strategies which can be used in combination with either the two- or one-directional control strategy to emulate pointer actions (e.g., pointing and clicking on an option).

Another object of the invention is to provide a variety of complementary software one-dimensional interface strategies which can be used in combination with either the two- or one-directional control strategy to emulate character input actions (e.g., typing text to a word processing program).

Another object of the invention is to provide the user a mechanism for measuring and adjusting for unwanted sporadic motions in the user's operation of the one- or two-directional control to make it appear more constant in velocity and smoother when displayed on the computer monitor.

A further object is to provide an apparatus that applies external forces to stabilize and smooth a user's operation of a control to make it more constant in velocity.

A further object of the invention is to provide the user an apparatus which limits the movement of conventional pointers to the single dimension for which the user has the greatest control.

Another object of the invention is to provide a mechanism that provides appropriate external force to augment those muscles working antagonistically to the muscles used to operate a one-directional control because there is not adequate strength or control to return to the one-directional starting position without such assistance.

Another object of the invention is to provide a mechanism by which the user can voluntarily alter the relative speed and direction of the one- or two-directional control while in operation.

Another object of the invention is to provide an apparatus for using the output of various existing sensors as input for the one- and two-directional controls or modifying existing switches which currently measure non-dichotomous variables but convert them to dichotomous output to serve as a simple switch.

A further object is to provide a method and apparatus for assessing a user to determine whether the user is a good candidate for either one-dimensional control approach relative to a conventional two-dimensional approach and to other existing control strategies available, whether a one- or two-directional is estimated to be better, which user response and corresponding control device is best, whether and what modifications are indicated to smooth the user's response, whether additional apparatus is indicated (e.g., a guide for a conventional pointer or an apparatus to augment the muscles working antagonistically to those performing the primary response), which interface strategy is best for pointer emulation, which interface is best for character input emulation, and produce a written summary of the findings.

In accordance with a preferred embodiment of the invention, a process or apparatus that provides a computer user needing to perform pointer activities, typing activities, and other computer input strategies which usually rely on placement and selection of a target in two dimensions, an alternative control and input method based on control in both directions of one dimension comprising the steps of: a) identifying a target user response (motor, behavioral, psychophysiological, etc.) which, when performed by the user, can result in a number of values along a single dimension; b) providing a control apparatus or sensor that detects and measures changes in the said target user response and outputs corresponding monotonically related values to be used as input to a computer; c) providing a mechanism that uses input in both directions from the said control apparatus in combination with a one-dimensional interface method to perform an action normally performed in two dimensions and requiring two-dimensional control by allowing the user to operate the said control apparatus in either direction to determine the first of two coordinates on the two-dimensional screen location for the target; d) providing a mechanism for selecting that first two-dimensional coordinate; e) providing a mechanism for automatically selecting the target if it is the only alternative available for that coordinate and if a target location in a second dimension is required, providing a mechanism that uses input in both directions from the said control apparatus in combination with a one-dimensional interface method to allow the user to operate the said control apparatus in either direction to determine the second of two coordinates on the two-dimensional screen location for the target; f) if selection of the target location in a second dimension is required, providing a mechanism for selecting the target's location in the second dimension; g) if emulating a mouse pointer, providing a mechanism which, once the screen location of the target has been determined, allows the user to specify the action to be taken at that site (e.g., click, double-click, drag, select, etc.); and h) providing a mechanism for an option which, when selected by a user, allows the user to cancel the selected location before applying an action (in case the wrong location was selected in mouse emulation or wrong key typed in keyboard emulation).

In accordance with another preferred embodiment of the invention, a process or apparatus that provides a computer user needing to perform pointer activities, typing activities, and other computer input strategies which rely on placement and selection of a target in two dimensions, an alternative control and input method based on control in one direction along a single dimension comprising the steps of: a) identifying a target user response (motor, behavioral, mental, psychophysiological, etc.) which, when performed by the user, can result in a number of values along a single dimension; b) providing a control apparatus or sensor that detects and measures changes in the said target user response and outputs corresponding monotonically related values to be used as input to a computer; c) providing a mechanism that uses input in one of the two directions from the said control apparatus in combination with a one-dimensional interface method to perform an action normally performed in two dimensions and requiring two-dimensional control by allowing the user to operate the said control apparatus in one direction to determine the first of two coordinates on the two-dimensional screen location for the target; d) providing a mechanism for selecting that first two-dimensional coordinate; e) providing a mechanism for automatically selecting the target if it is the only alternative available for that coordinate and if a target location in a second dimension is required, providing a mechanism that uses input in one direction of the single dimension being measured by the said control apparatus in combination with a one-dimensional interface method to allow the user to operate the said control apparatus in one direction to determine the second of two coordinates on the two-dimensional screen location for the target; f) if selection of the target location in a second dimension is required, providing a mechanism for selecting the target's location in the second dimension; g) if emulating a mouse pointer, providing a mechanism which, once the screen location of the target has been determined, allows the user to specify the action to be taken at that site (e.g., click, double-click, drag, select, etc.); h) providing a mechanism for an option which, when selected by a user, allows the user to cancel the selected location before applying an action (in case the wrong location was selected in mouse emulation or wrong key typed in keyboard emulation); and i) providing a mechanism which, because movement in only one direction is provided, allows the screen location being offered to either "wrap" back to the logical origin of movement (e.g., when moving down a list of options and reaching the end of the list jumps back to the beginning of the list and continues downward, when moving to the right on a display and reaching the right edge of the display jumps back to the left edge and continues moving to the right, etc.), or provide an option for reversing the primary direction being used (e.g., to move back to a target that was just passed over).

In accordance with another preferred embodiment of the invention, an apparatus and process which provide a user capable of operating a one-directional controller and corresponding one-dimensional interface method but lacking adequate strength or control in the antagonistic muscle groups needed to, for example, return the arm to a neutral starting position, external assistance in doing so comprising the steps of: a) providing a comfortable neutral resting position from which the user can freely make movements with minimal external resistance in the direction pre-established to be the direction that results in the greatest control and precision for that user; b) applying a counterforce (e.g., using springs, counterweights, motor/robotic, solenoids, elastic material, gravity, pneumatic sources, hydraulic sources, etc.) either directly to the user's arm or indirectly to the user's arm (e.g., a carriage in which the user's arm is resting) with said counterforce being applied in the opposite direction to that of preferred movement such that it is either constant regardless of the location of the carriage, increases as the amplitude of movement increases, or is not applied at all until triggered by a mechanism that detects when the user has completed movement; c) in the event that the counterforce is only applied at the completion of the preferred movement, then a mechanism is provided which is either incorporated into the apparatus (e.g., detected when the user pauses for a specified period of time or operates a switch) or incorporated into the one-directional control software (e.g., when the user makes a selection by any mechanism) and sends a signal that the response has been completed to a counterforce controller located on the apparatus which then applies an appropriate counterforce to return the user's arm to the neutral resting location, requiring little or no physical strength or coordination from the user and resulting in no discomfort to the user; and d) providing appropriate safety mechanisms to insure that excessive force is not applied (e.g., excessive resistance is detected and the force terminated, the user is allowed to terminate the external force at any time, the user is allowed to exit the apparatus at any time, etc.).

In accordance with another preferred embodiment of the invention, a process and apparatus that provides a method of assessing whether a specific computer user would benefit from the a one-dimensional input method; which hardware controller is likely to be the best; whether the abilities of the user are better suited for a one- or two-directional input method; estimates of the values of the settings likely to work for the user; if a one-directional input method is indicated, whether the user is a good or poor candidate for an additional apparatus that augments the muscle groups which are antagonistic to those being used to operate the controller; which input method for emulating pointer activities is best for this user and the corresponding preferred settings; and which input method for emulating character input is best for this user and the corresponding preferred settings comprising the steps of: a) soliciting information and estimates from the user, rehabilitation professional, family, caregivers, etc., about the amount of control and range of motion (if appropriate) the user has for using different parts of the body (e.g., hands, arms, legs, feet, fingers, lips, head, oral, etc.) with the goal of identifying a target user response (motor, behavioral, mental, psychophysiological, etc.); b) starting with the most promising response (e.g., highest control and greatest range of motion), identify and provide a control apparatus or sensor capable of measuring that behavior, including, if available and appropriate, both standard two-dimensional input devices (mouse, joystick, trackball, etc.) and input devices targeted for the disabled population (proximity sensors, puff-and-sip sensors, video cameras, electrophysiological sensors, etc.), and adjust the user and control device so that it is comfortable to the user; c) conducting a series of trials in which representative pointing tasks are performed by the user in which a one-dimensional input method, and a standard two-dimensional input method (if available and appropriate), and standard switch scanning (as appropriate) are used to, for example, point at a target presented on the display and measure the user's performance under the different conditions; d) during said trials, soliciting and inputting the user's subjective reaction to the various controllers, methods, dimensions, and directions tested; e) analyzing the resulting performance and subjective data to provide estimates of whether one of the one-dimensional input methods is likely to produce performance superior to standard two-dimensional input methods or scanning methods and, if so, which controller is the best candidate, which dimension is the best candidate, and whether control is significantly better in one direction for that dimension—if so, then more trials should be conducted to evaluate performance on the one-directional method relative to performance on the one-directional method, as well as (and if appropriate) tests of an apparatus to supplement the user's antagonistic muscle groups for the identified one-directional behavior; f) for users found to benefit from a one-dimensional input method, the identified superior method is then employed by the user to conduct additional trials with the goal of calibrating the settings for the selected system (e.g., the range of movement comfortable to the user, the gain to be applied to maximize the user's range of movement, if a counterforce apparatus is indicated and available—how much force should be applied to supplement the user's antagonistic muscle groups, etc.); g) for all users, additional test trials are conducted to measure the selected user response when moving to displayed targets and the resulting movement patterns analyzed to determine whether corrections should be applied (for example, for a user who, when making a movement initially exhibits a burst of movement followed by more controlled movement, a correction is applied that reduces or eliminates the initial burst); h) in the event that it is determined that a user is capable of small but controlled movements, but simply increasing the gain results in significant loss in accuracy, then a series of trials are delivered in which, for example, the ratcheting and modified ratcheting methods are attempted, measured, and, if found to improve performance, adjusted to levels that result in higher performance and user satisfaction; i) the final controller, method, settings, and corrections established in the preceding steps are utilized by the user when trying different one-dimensional input strategies for pointer activities and character input activities and the user's performance as well as preference are used to determine which pointer and character input strategies will be used; j) for each selected input strategy (mouse emulation and character input), trials are conducted to determine the final settings for those interfaces (e.g., if using left and right on a joystick as the one-dimensional behavior, then when selecting a vertical location, should leftward movement of the controller produce upward or downward movement on the display, etc.); and k) preparing a final written summary of all findings including which responses and controllers were evaluated, a summary of the results of each phase of testing, a list of specific recommendations (e.g., pointer type, supporting apparatus, settings to be used in control software, etc.).

Other objects and advantages of the present invention will become apparent from the following descriptions, taken in connection with the accompanying drawings, wherein, by way of illustration and example, an embodiment of the present invention is disclosed.

BRIEF DESCRIPTION OF THE SEVERAL DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 shows a representative prior art mouse emulator with which a user operates a single dichotomous switch to first select the region of the display containing the target location as shown in Frame 1, then selects the vertical location of the target point as shown in the top portion of Frame 2, then selects the horizontal location as depicted in the lower portion of Frame 2, and finally selects the click operation to be performed at that location (e.g., click, double click, etc.) as shown in Frame 3.

FIG. 2 shows a representative prior art on-screen keyboard input mechanisms including a traditional "QWERTY" keyboard layout as shown in Frame 1 and with an alphabetic keyboard layout as shown in Frame 2.

FIG. 3 shows a representative prior art Row/Column switch scanning character input method in which rows are sequentially highlighted (Frames 1 and 2), the user operates a switch to select a row as shown in Frame 2, keys are sequentially highlighted (Frames 3 and 4), and the user operates a switch to select the desired key as shown in Frame 4.

FIG. 4 shows an example of another existing technology called list-based typing in which the word "your" is typed by first selecting the first letter "y" from an on-screen keyboard as shown in Frame 1 and then selecting subsequent letters from presented one-dimensional lists of possible options as shown in Frames 2-4.

FIG. 5 shows how conventional two-dimensional pointers can further be adapted to facilitate a user moving horizontally in one dimension (as in Frame 1 with a mouse and Frame 3 with a joystick) and vertically (as in Frame 2 with a mouse and Frame 4 with a joystick) by adding an apparatus that limits their movement to one dimension.

Figure 6:
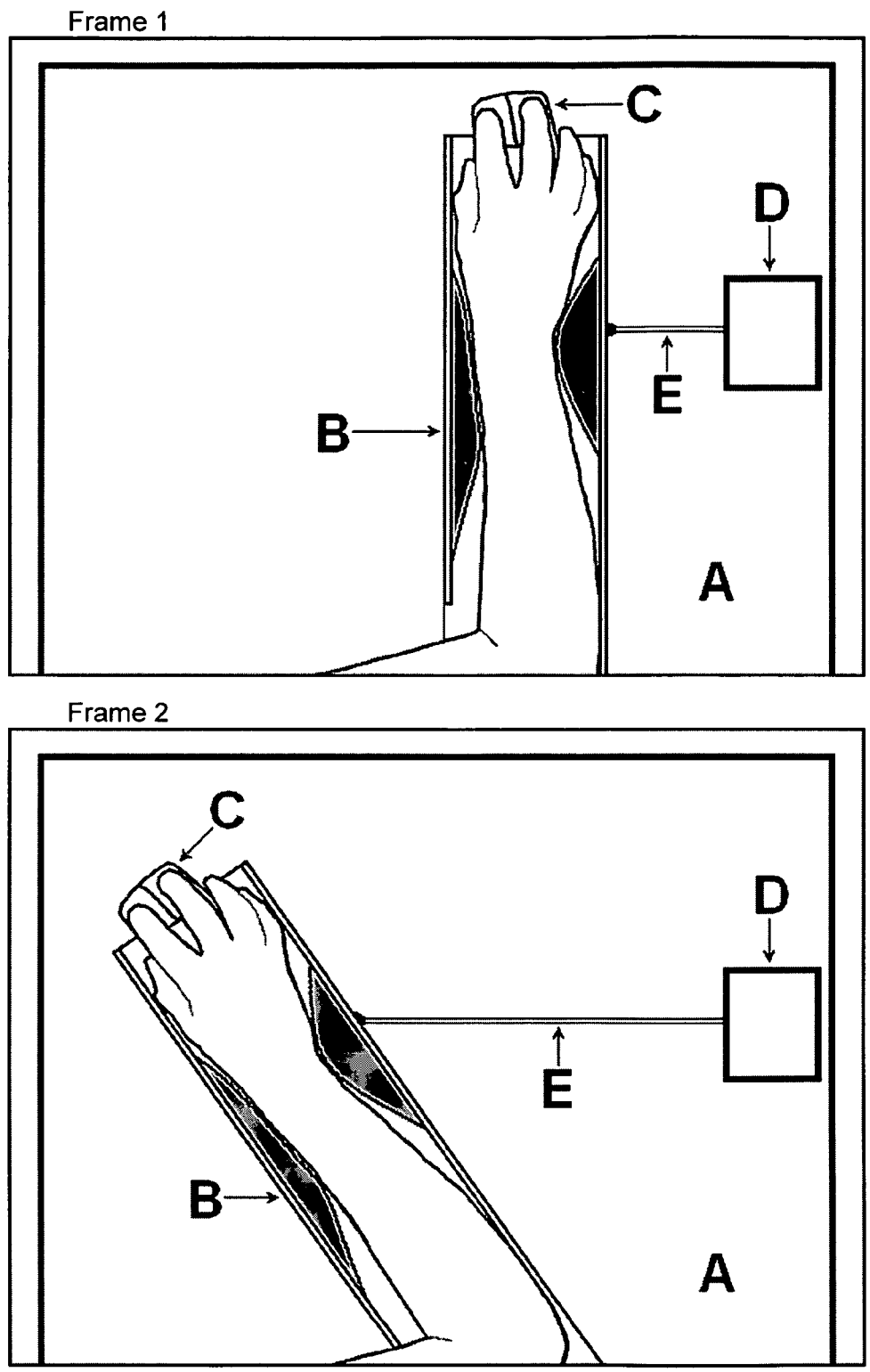

FIG. 6 shows an example of a Counterforce Apparatus in which a user who has adequate control moving the forearm to the left to identify a location (as shown in Frame 1) but is provided an external force from a variety of optional mechanisms (shown here at point D) to augment those muscle group(s) working antagonistically to the control muscles in order to return the user's arm to the original starting location.

Figure 7:
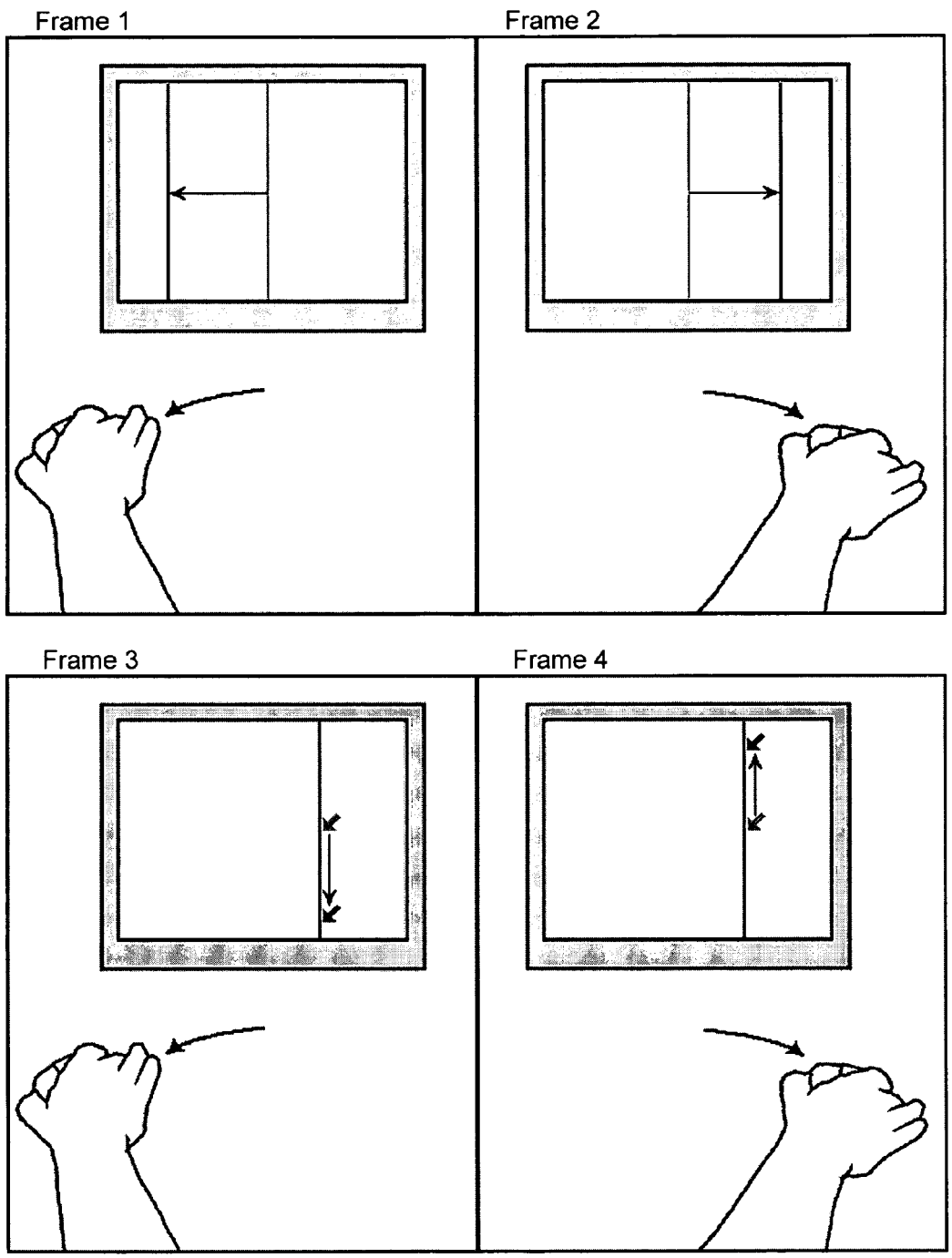

FIG. 7 shows an example of the horizontal/vertical line strategy when using a standard mouse pointer with a Two-Directional input method in which the user first identifies the horizontal location of the target by moving the mouse left or right (Two-Directional (shown in Frames 1 and 2) and then identifies the vertical location by similarly moving the mouse left or right (Two-Directional—shown in Frames 3 and 4).

Figure 8:
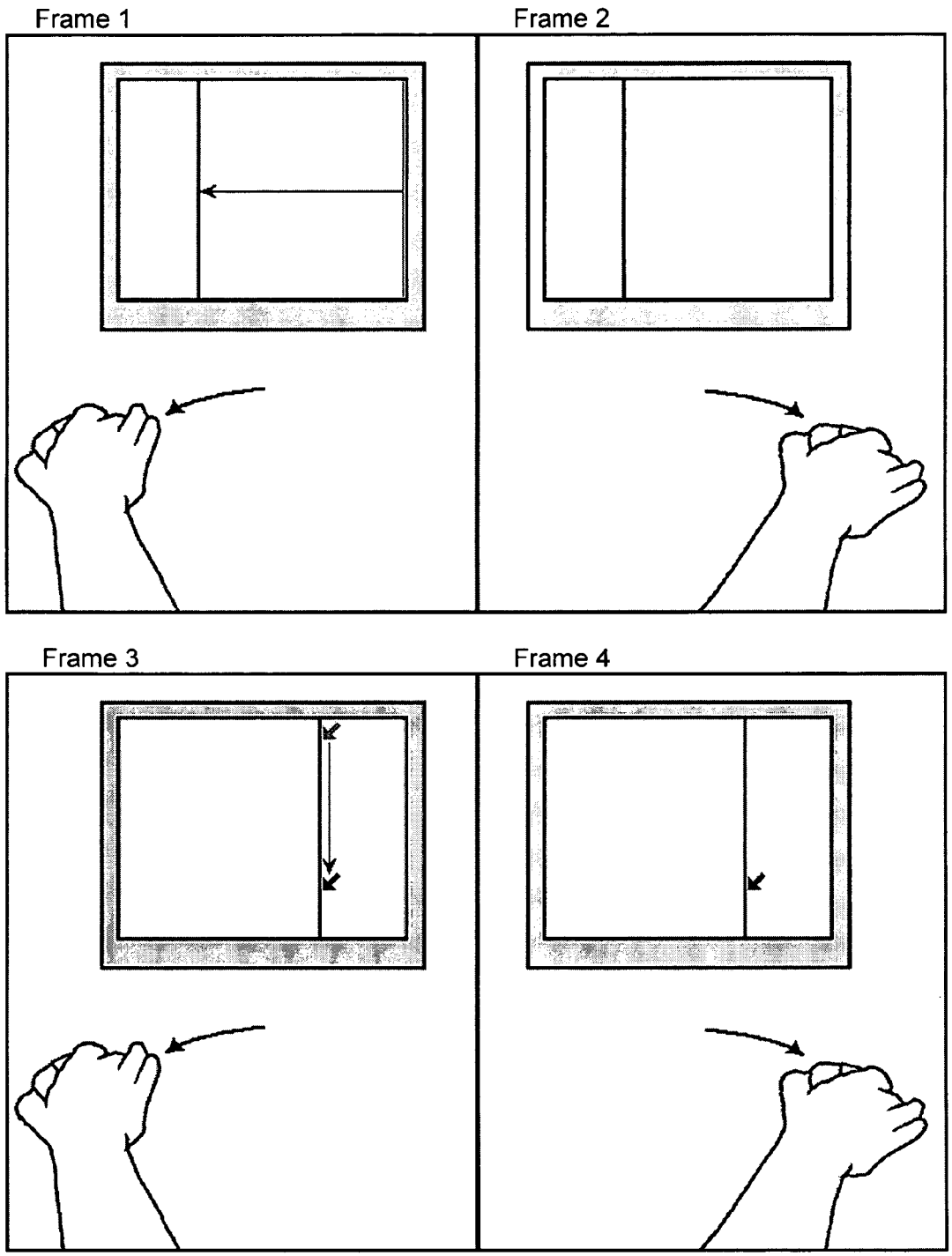

FIG. 8 shows an example of the horizontal/vertical line strategy when using a standard mouse pointer with a One-Directional input method in which the user first identifies the horizontal location of the target by moving the mouse to the left (shown in Frame 1), moving the arm back to the right with no effect on the cursor (shown in Frame 2), and then after selecting the horizontal location, identifies the vertical location by similarly moving the mouse to the left (Frame 3) and then resets the arm with no effect on the cursor (Frame 4).

DETAILED DESCRIPTION OF THE PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The invention uses the emulation of various actions usually performed by a computer pointer (e.g., pointing and clicking), and typing English words to a software application with an on-screen keyboard as examples of the invention, yet, the invention is much more general and not limited, for example, to words, but rather is a method that can be applied to any real or contrived pointer or character input activities.

The common theme that runs throughout the different forms of the invention is that of a One-Dimensional control of a computer or computer-like electronic apparatus which typically requires a user to behaviorally perform in two dimensions (e.g., using a mouse pointer or a hardware or on-screen keyboard). While all forms of the invention share that common theme, various forms of the invention are described below that further specify and enhance that approach. Specifically, the eight components in this invention are 1) the One-Dimensional control strategy used including a) the use of Two-Directional Control and b) the use of One-Directional Control, 2) the controller or transducer used to measure the user's behavioral response, 3) the use of existing or slightly modified commercially available pointer controls, 4) the creation of new One-Dimensional controls, 5) mechanisms for augmenting antagonistic muscle groups, 6) the combination of One-Dimensional Controls (Two- or One-Directional) with different software interface methods designed to emulate two-dimensional pointer activities, 7) the combination of One-Dimensional Controls (Two- or One-Directional) with different software interface methods designed to emulate keyboard character input, and 8) the use of assessment strategies to match the abilities of a user to the most effective combination of One-Dimensional Control features. In the next section, an example of the basic One-Dimensional Control method is presented.

Illustrative Example of the Basic One-Dimensional Interface Control Mechanism. Research reported in the literature support the idea that some people have better control (as measured by accuracy and speed) when operating in one dimension than simultaneously in two independent dimensions. This is especially true for persons with disabilities involving the upper extremities because coordination in two dimensions is more complex than movement in a single dimension (e.g., a disabled person might be able to move the right hand up and down or right and left more accurately than moving the hand right and up simultaneously—as required by conventional computer pointers). Moreover, it is likely that for a given individual, a single dimension can be determined along which control is greater than other possible dimensions (e.g., a person might be able to move the right hand right and left more accurately than up and down). In addition to such "Two-Directional" methods, it is further possible that control is greater in one direction along that dimension than in the other (e.g., a person might be able to move the right hand up more accurately than moving the right hand down—because different antagonistic muscle groups are required). Hence, other forms of the invention are called "One-Directional" control methods because they are designed to exploit the capability of a user to operate a single control along one direction within a single dimension. For a specific person, this is determined by first identifying the body part (e.g., hand, foot, finger, etc.) that has the best muscle control, then further, identifying the single dimension along which that individual has the greatest control, and finally, determining whether control is significantly greater along one direction of that single dimension. If a person is found to have substantial control within a single dimension, but essentially equal control along the two orthogonal directions within that dimension, then that person would be a candidate for a Two-Dimensional Control form of the invention as described in the next section. However, if a person is found to have greater control in one direction than in the opposite direction, then that person is a candidate for the One-Directional Control form of the invention as described in the second section below.

One-Dimensional Control: Adequate Control in Two Directions. The first general form of the invention comprises an input control apparatus capable of measuring a user's behavior (muscle, aural, oral, electrophysiological, etc.) in one dimension and which utilizes a software interface method that translates movements in both directions of that dimension into related movements/activities on the display designed to emulate pointer or keyboard functions (see sections below describing some representative software interface methods).

An example might be useful to illustrate this basic form of the invention. For the control device, assume that a standard mouse pointer is the hardware input control apparatus. Although the mouse actually provides movement/location information in two orthogonal dimensions, the software interface component of the invention includes a mechanism that ignores changes in one of the two dimensions. Assume that the user in this example has been assessed (see below section on assessment) and it has been determined that this person is much more accurate when moving the hand forward and backward (called the "vertical" dimension here) than when either moving the hand left and right (i.e., the horizontal dimension). One of the critical components in this invention is that, for this person, information about horizontal movements is ignored and the only control possible (with regard to the movements of the user's hand) is forward and backward (two directions) in the single vertical dimension.

In addition to disregarding information about one of the two dimensions, and as a further example of the interface method, assume that a single horizontal line initially is positioned at the vertical center of the display (or—by user option—the center of a dialog box that currently has the focus, the site of a just-completed mouse action, etc.). When the user moves the mouse forward, the line moves up (by a distance scaled to provide that user relatively high speed, accuracy, and enough range to reach the top of the display). Similarly, when the user moves the mouse backward, the line moves down. The user's first task is to move the horizontal line up or down until it is vertically centered on the target location, and then make a selection. For persons able to use the mouse switch or some external switch, the switch is used to make the selection. For others unable to operate such a switch, other options are available such as a software dwell switch (a dwell switch is prior art in which a user selects an item by pointing at it for a specified period of time). Still another option is that for users who are able to move the pointer in an orthogonal direction (albeit with less control), a sudden movement to the left or right could signal a selection (although it has no affect on the location of the horizontal line being positioned).

At this point, the user has selected the vertical location of the target. The software interface then leaves the horizontal line in place and presents an additional vertical line, icon, or other graphic depicting screen location at the horizontal center of the horizontal line. Now, moving the mouse forward has the effect of moving the line or icon to the right and moving the mouse backward has the effect of moving it to the left (or vice versa—depending on the user's preference); the point is that the same vertical physical movement of the controller is used to select the horizontal location.

After the horizontal location is selected, the user has specified the target location, and then, for example, a menu then is presented that is similar to that shown in Frame 3 of FIG. 1, with options to Click, Double Click, Drag, etc. However, unlike Frame 3 of FIG. 1 in which the computer "scanned" the menu, the pointer is placed on the middle option and again, by moving the mouse forward and backward (with the pointer never allowed to move outside the menu), the user moves to the desired option, selects it, and the selected action is executed.

The above approach also can be used for text entry using an on-screen keyboard (i.e., by using that method to click on each key). However, for a more usable example, assume that a mechanism is provided with which the user can change from a "mouse emulation" method as described above, to a "keyboard emulation" method. Now, the initial starting location is the vertical center of the keyboard. When the user moves the mouse forward and backward, rows in the keyboard are highlighted (the user is not allowed to leave the keyboard). When the row containing the target character is highlighted, the user selects that row (using a switch, dwell, orthogonal movement, etc. as above). If the top row was selected, the middle key in the top row then is highlighted and moving the mouse forward or backward results in the key being highlighted moving to the left or right. When the desired key is highlighted, it is automatically selected (to save the user time and effort—because specifying a key implies its selection). To the extent that the user has good control in the specified single dimension, this approach should produce faster and more accurate mouse emulation and character input than current scanning techniques. In addition, such approaches provide users with a stronger sense of control over the situation than traditional scanning.

One-Dimensional Control: Adequate Control in One Direction. Based on the literature, there are individuals who have relatively greater control when moving in one direction than another (as determined by an assessment mechanism—see the section below). Again, an example is useful to illustrate this "One-Directional Control" form of the invention. Using the same general interface strategy as described just above, assume that another user has been found to have relatively good control of a mouse when moving it forward, but relatively poor control of the antagonistic muscles involved when moving it backward. In this case, the user can move the mouse backward, but not with the control necessary to aim at a target (even in one direction).

For this situation, the interface strategy described above is modified to accommodate this user's ability. Instead of positioning the initial horizontal line at the vertical center of the display or active dialog box or site of the last mouse operation, the initial horizontal line is positioned at the bottom of the display or bottom of an active dialog box. Moving the mouse forward causes the line to move upward, but moving it backward (e.g., to reposition the arm), has no effect on the horizontal line (i.e., it can only be moved upward). After positioning the horizontal line on the target, the user selects that vertical location (e.g., using any of the methods described above), and a vertical line or icon is now positioned at the extreme right side of the display (or dialog box). Moving the mouse forward now moves the icon to the left (of course, the icon could start at the left side and be moved to the right—depending on user preference). When the horizontal location is specified, the target location is known and the menu described above is displayed with the right-most option (probably "click") highlighted. Now upward movement of the mouse forward moves the highlighted option leftward on the menu, and the user selects the desired switch operation. In the event a user overshoots a target, various options are available to reverse direction. Also, "wrapping" is an option in which, for example, leftward movement that reaches the left border of the display "wraps" to the other side—the icon or cursor "jumps" to the extreme right side of the display and leftward movement continues.

Turning now to a typing example, and staying with the typing interface strategy used in the Two-Directional Control example provided above, the bottom row of keys on the on-screen keyboard initially is highlighted, and forward movement of the mouse successively highlights the other rows (bottom to top). Backward movement of the mouse has no effect on the display. When the row containing the target key is highlighted, the user makes a selection and the right-most key is highlighted or an icon is placed at the extreme right side of the keyboard (or on the left—by preference) and forward movement of the mouse is translated to leftward movement of the keys being highlighted. When the target key is selected, it is automatically typed.

Hardware Controller or Transducer Apparatus Used to Measure the User's Behavior. A wide range of existing, modified, and new control devices can serve as the control apparatus that detects one-dimensional changes in a user's behavior. Detected changes that result in dichotomous on/off states cannot be used with the invention unless modified to produce multi-valued, continuous or discontinuous measures which are monotonically related to some dimension of the user's behavior. The user's behavior generally involves direct muscle activity (as in the above mouse pointer examples), but could involve sensors which indirectly measure muscle activity (e.g., proximity sensors; optical sensors that measure point of gaze or location of the head or another body part; pneumatic sensors that measure air pressure from puffing and sipping; sound sensors that measure volume of utterances; etc.), or even more subtle behaviors that are not directly observable but can be measured through electrophysiological activity (e.g., measures of electrical activity or skin activity related to cognitive, emotional, or muscle activity such as those measured by electromyography, electro-oculography, galvanic skin response, electroencephalography, etc.). Examples of such apparatuses are presented in the following two sections.

Using Existing Commercial Pointers. One of the benefits of the invention is that i is compatible with many currently existing two-dimensional input controls such as the mouse, joystick, trackball, etc. To the extent that a person is capable of using such a device accurately when operating it in one or two directions of one dimension, then the controlling software for the invention can disregard changes in the other dimension and provide the user One- or Two-Directional control in the optimal single dimension.

It should be noted that, although the above examples use forward/backward and left/right as the two dimensions, those are only examples and are used because they provide somewhat standard and understandable examples. The four primary diagonals (i.e., 45°, 135°, 225°, and 315°) are other reasonable examples, in fact, literally any single direction at any angle can be used if it was found to be the best for a specific user. Alterations in the control interface software can be made to convert measures from the pointer to meaningfully scaled movements on the display; or, the pointer itself can sometimes be reoriented for the same purpose (e.g., the base of a trackball or joystick can be rotated to assure that the transducers in the pointer adequately capture movement in the desired direction).

It also should be noted (and is considered to be an important mechanism in this invention) that the control software can be used with any input control (existing or new) to attempt to transform the possibly non-linear movement of the user to a more constant velocity movement on the display. For example, imagine that in the assessment form of the invention (see section below), when asked to move a mouse at a constant speed to the left, it is found that the resulting movement produced by the individual and, hence, on the computer display is not at a constant speed, but rather, the user fairly consistently begins the movement with a substantial acceleration (jerk) which is then followed by a deceleration and the final portion of the movement is somewhat constant. As a mechanism in the invention, this erratic behavior can be transformed into a more constant velocity on the display, which might provide the user more accuracy. This could include applying a mechanism for "smoothing" the resulting cursor movement as well as applying other mechanisms for transforming a consistent but non-linear movement pattern into a more controlled linear pattern. Similarly, as an option, mechanisms can be included in the control program to sample and monitor a user's movement pattern and apply corrections during its use. In addition, a mechanism is available for a user to voluntarily recalibrate and adjust the relationship between body movement and resulting cursor movement. Finally, an apparatus can be added to the control apparatus which varies the amount of external force applied to resist the user's movement of the controller. For example, patterns of movement or pressure over the course of the user's movement can be measured and then used by the apparatus to provide an external counterforce or resistance to dampen a user's excessive movement during those phases of the controller operation known to coincide with excessive force or movement and apply little or no counterforce during those phases of the controller operation known to be smooth, stable, and well controlled.

Another potentially useful modification for existing devices is the addition of a physical apparatus that acts as a guide or guard that reduces the movement of a standard 2-dimensional pointer to one direction. It is potentially useful because, although the control software can ignore movements in directions incompatible with the selected dimension, the user might physically benefit by an apparatus that constrains unwanted and random movement to a specified dimension, range, and location. FIG. 5 depicts examples of such an apparatus when used with a standard mouse pointer in the horizontal dimension (Frame 1) and in the vertical dimension (Frame 2). The conventional mouse (A) is physically secured (e.g., with a set screw) in a carriage (B) that slides freely in a channel in the main platform (C) allowing movement in one dimension (left/right in Frame 1 and forward/backward in Frame 2), but not in other incompatible directions (e.g., tongue and groove relationship between the carriage and the platform). Also, adjustable "stops" (as in D) can be set to limit the total movement to a specific range known to be best for a given user. Not shown in FIG. 5, optional handles can be attached to the carriage to make use of the device easier, more natural, or better suit the posture or abilities for a specific user (e.g., for the mouse apparatus shown in Frames 1 and 2, a vertical stick, ball, grip, etc., which is easy for the user to grasp can be attached to the carriage). In addition, and also not shown in FIG. 5, "notches" can be provided perpendicular to the dimension of movement allowed which allow those users capable of some limited perpendicular movement make a selection (e.g., a perpendicular slot could be provided at the resting point for a person using the One-Directional form of the invention to "click" on a current location). Frames 3 and 4 show an analogous pair of apparatuses for a conventional joystick, limiting movement to the horizontal dimension in Frame 3 and vertical dimension in Frame 4. Finally, any such apparatus can be attached to an adjustable platform or gooseneck to provide still other orientations which could be more natural for some users (e.g., either the mouse or joystick platforms can be attached to an adjustable arm or platform in a way that complements the user's posture and ability).

While the major advantage of using existing pointers is the reduced cost for the user of this invention, another advantage is that other existing assistive devices, although designed to improve control in two dimensions, could be of used with this invention (e.g., custom extensions and handles for joystick controls). Finally, a variety of custom mounting products (e.g., adjustable arms, platforms, etc.) are available for existing pointers and could be used by a rehabilitation professional to position the pointer in an orientation that best matches the dimension of optimal control.

Modifying and Creating New One-Dimensional Control Mechanisms. Numerous custom switches are available which are targeted for the disabled population for the purpose of capturing a behavior for input to scanning software (as described above). Here, a switch is defined as a very limited type of controller with an output that is not two- or one-dimensional but rather provides a dichotomous on/off output. Defined in this way, switches are not appropriate control candidates for this invention. However, it should be noted that numerous such switches are very close to being good candidates. Specifically, a number of such switches utilize a transducers or sensors for detecting proximity, movement, light, pressure, etc., which, produce electrical output which is monotonically related to the physical stimulus being sensed (i.e., sound, pressure, light, movement, etc.). Although that more basic output could be used for a one-dimensional control appropriate to this invention, it is not currently being used in that way. Rather, additional circuitry is provided to convert the data from the sensor to a dichotomous on/off output such that, for example, the output conveyed is "off" when the signal's strength is below a set threshold and conveyed as "on" when the signal's strength is above that threshold. The amount of physical energy that triggers such a device to change from the off state to the on state can be preset in the switch circuitry, or very often, can be adjusted by a "sensitivity" adjustment on the device. This latter form of switch is very commonly used by the disabled population, because the sensitivity adjustment must usually be set for a value that is appropriate for a specific user/situation. For example, such a switch designed to measure pressure might be set to a high threshold for one user who 1) is capable of providing a substantial force to make a response and 2) makes frequent unintentional responses which need to be filtered out. In contrast, the sensitivity of the same switch might need to be set very low for another person who can make fairly controlled responses, but can generate very little pressure.

While existing sensors can be used to capture, measure, and convey estimates of a physical stimulus, other new control devices are required that provide one-dimensional input appropriate for the invention. Such a control uses input from existing sensors but, rather than producing a dichotomous output value, produces values which 1) appropriately reflect the full range of values from the sensor, 2) are transformed to be consistent the range of input standard for conventional pointers, and 3) can be easily provided to a conventional computer (e.g., using a USB or other conventional input port or connection). In addition, such a controller provides a mechanism by which the range of data from the sensor can be calibrated for a specific situation (e.g., using a proximity sensor for one user might require detecting proximity from 0.5 cm to 3.0 cm—the entire range of movement possible for that person, while the same sensor used for another person must be calibrated so that the full range of movement is detected between 1.0 cm and 12 cm). Because of the nature of the physiological abilities for most potential users, some of the more promising candidate behaviors are measures of electrophysiological activity (especially those occurring in the brain or head), force/pressure transducers that can measure air pressure of a user sipping or puffing on a tube (i.e., common "sip-and-puff" switches or transducers which measure the pressure exerted during biting), and those measuring subtle movements (e.g., proximity sensors, sensitive pressure sensors, optical sensors that detect subtle movement, etc.).

For persons who prefer using a finger or arm, variations of the classic lever control or wheel control (which are limited to one dimensional movement) provide the basis for families of new input controls more specifically targeted for this invention. The physical guides described above are built into these new controllers, as well as platforms/arms which can be adjusted in numerous dimensions to provide a large number of possible orientations for the purpose of complementing a user's optimal control dimension.

Counterforce Apparatus. An important part of this invention is that for any Two- or One-Directional interface involving a user's motor behavior, an apparatus can be added to augment the user's performance by, for example, helping the user return the involved body part to a starting position. Although such an apparatus can be useful for the Two-Directional form of the invention (e.g., to apply force in both directions to stabilize overall movement), the better example provided here is for a person using the One-Directional form of the invention because, by definition, such a user is likely to have more control problems moving in the direction opposite to the one being used for controlled input (i.e., returning to a starting point after positioning a cursor). Such a user might benefit from an apparatus that physically applies a force to assist the muscles working antagonistically to muscles involved in making the preferred movement. While such an apparatus can be created for virtually any muscle group (e.g., those controlling a finger, arm, wrist, leg, foot, neck, etc.) the example provided here is for a person using a standard mouse.

FIG. 6 depicts a representative design for such an apparatus in which the user rests the right elbow and forearm on a carriage with padded walls on the bottom, left, and right walls (depicted at point "B"). Not shown in FIG. 6, various handles or a ball can be provided for users preferring to grasp such objects. The platform is attached to a larger platform (shown at point "A") at a single point near the end of the carriage and under where the user's elbow, allowing the user to carriage to pivot clockwise and counterclockwise with the location of the elbow serving as the pivot point (Frames 1 and 2). With this apparatus, the user can, for example, move counterclockwise to the left to identify a screen location (as shown in Frame 2). An external force in the opposite direction (i.e., counterforce) and originating in a mechanism depicted as "D" in FIG. 6 is conveyed by a wire or other suitable connector (depicted as "E"), to the carriage, helping the user return the arm to the starting location. The overall left and right movement of the carriage is sensed by either an attached conventional mouse pointer (as shown at "C") or a built-in one-dimensional transducer (e.g., optical, mechanical, proximity, etc.), and the output from either is then conveyed to a computer as pointer input. It should be noted that although a horizontal orientation, clockwise/counterclockwise movement of the forearm, and counterclockwise as the primary control direction are used in this example, the invention is more general and could be used with any reasonable orientation, direction(s), body part, transducer type, etc.

The counterforce can be produced a number of ways including but not limited to springs, counterweights, motor/robotic, solenoids, elastic material, gravity, pneumatic sources, hydraulic sources, etc. Also, the counterforce can be applied such that it is constant regardless of the location of the carriage, increases as the carriage moves further away from Point B, or is not applied at all until triggered by some external event (e.g., when the user makes a selection, feedback could be provided to the apparatus from the controlling software on the computer being used). Of course, care must be taken to insure that the apparatus is safe for the user (e.g., that the appropriate amount of force is applied and that sensors are included which can detect when too much force is being applied and reduce/eliminate the external force, that safe limits are set to the amount of force that can be generated, that the user has an easy way to stop and exit the apparatus, etc.).

Two-Directional and One-Directional Software Interface Methods: Emulating Pointer Functions. Several interface strategies are available for use with Two- or One-Directional controls to emulate pointer functions. Below, representative examples of such strategies are provided. For each strategy, an example first is presented for how that strategy would be implemented with a Two-Directional control followed by an example utilizing a One-Directional control. In all cases except one, the strategy involves combining One- or Two-Directional control mechanisms with input strategies which are existing art, originally created for use in conjunction with either scanning or voice input.

It may be helpful to define some other terms which will be used in the following sections. The term "selects" or "makes selection" is used to include a variety of methods a user might apply to signal a choice (e.g., how the user makes a "location selection" or a "click selection"). The actual method used depends primarily on the physical ability of the user. If capable, a user might operate a switch to signal selection (a large variety of switches are available—see the above discussion). Another option commonly used in assistive technology is a "dwell switch," in which, for example, aiming at a location for a specified period time is interpreted by the control software as signaling a selection. A third method that is novel and made possible by the approach taken here is that movement in an orthogonal dimension can signal a selection (if the user is physically able). For example, in the present invention, if moving a pointer up and down is used as the primary single control dimension, then left/right movements typically are ignored. However, rather than being ignored, significant movement in the orthogonal dimension could be interpreted as a selection.

Another term used below is "makes a click selection." The two overall tasks performed with a pointer are 1) select a location on the display and 2) make a click selection (e.g., click, double click, drag, etc.). In the following discussion, the most emphasis is placed on the first task, but the second also is clearly important. One approach is that, in general, the method used to perform the second task should be similar to the task performed to complete the first task. For example, if a Two-Directional approach involving moving a mouse to the left and right was just used to select a location, then a horizontal menu is presented with the cursor in the middle, pointed at the most frequent "click" option, and the user then similarly moves the mouse left/right to make other selections (double click, drag, etc.).

In the first "Horizontal/Vertical Line Method," a simple vertical line extends across the entire display and is located at the horizontal center of the display. The user's Two-Directional movement of the control (e.g., left and right) moves the line left and right respectively and the amount of movement is pre-scaled (as part of the initial setup) so that the user can comfortably move to all possible horizontal locations. An example is shown in Frames 1 and 2 of FIG. 7. When the line intersects the target, the user makes a selection, at which time the first line remains at the selected location and a new short horizontal line or icon is presented at the vertical center of the vertical line. Now, the user's left/right movement of the pointer moves the icon down (Frame 3) or up (Frame 4) the vertical line (the relationship actually used is selected by the user). After the user has established the vertical location, the selected point is graphically marked and the user makes the desired click selection.

FIG. 8 presents an illustrative example of combining the One-Directional form of the invention with the Horizontal/Vertical Line Method. In Frame 1, the vertical line initially is presented at the extreme right side of the display (e.g., if it has been established that moving the pointer to the left yields the most accurate performance for this user). Frame 1 depicts the user moving the pointer to the left, producing the effect of moving the vertical line toward the target site. Frame 2 shows that if the user moves the pointer/control back to the right, it has no effect on the vertical line. If the user "overshoots," then the cursor wraps back to the right side of the display (or reverse direction options are provided). When the line intersects the target, the user makes a selection response and the vertical line remains on the display along with a new icon located at the top of the display. Now, as illustrated in Frame 3, leftward movement of the pointer causes the icon to descend the line and, when it coincides with the target location, the user makes a selection of the vertical location and then makes the click selection. In Frame 4, rightward movement of the pointer/control has no effect on the location of the cursor. If the target is on the far side of the display, then the user might use "ratcheting," in which an initial leftward movement causes the line to move only part of the way across the screen, followed by a rightward movement (which results in no movement of the line or icon but allows the user to return to a more comfortable starting posture), which then is followed by another leftward movement to approach the target. Ratcheting can be applied to either Two- or One-Directional forms of the invention, but it is more likely to be appropriate for One-Directional strategies (also, see the Modified Ratcheting method described below).

In a second "Ray Method," the cursor initially is positioned in the center of the display or at the site of the last click selection and a graphic "ray" is overlaid (e.g., a line starting at the cursor location that vertically extends to the top of the display). When used with the Two-Directional form of the invention, a single line is drawn through the origin that crosses the entire display. The user's movement of the pointer to the right causes the line to rotate clockwise, with the original location serving as the apex. Similarly, moving the pointer to the left causes the line to rotate counterclockwise about the origin. The user rotates the line until it intersects the target location, and then makes a location selection. Next, the cursor or icon appears at the origin and when the user moves the pointer to the left or right, the cursor is moved leftward or rightward along that line. The user then moves the cursor to the target, makes the location selection and then the click selection.

When combining the One-Directional form of the invention with the Ray Method a user's movement of the pointer in the preferred direction moves the ray in one direction (e.g., with the ray remaining anchored to the original point, the ray is rotated around that point in a clockwise direction) until it passes through the target at which time the user makes a location selection. Next, the cursor or an icon depicting location appears at the line's origin and, when the user moves the pointer in the preferred direction, the cursor moves out the ray until the user makes the location selection and then makes a click selection.

In a third "Section Method," a section of the screen initially is highlighted. For example, if the display is divided into nine equal sections (a matrix) with three rows each containing three rectangular sections, then the highlighted section might start in the central section and, when the user moves the controller left, the highlighting would move from the central section to the section to its left, then to the rightmost section on the top row, then the section to its left, etc. Similarly, when the control is moved to the right, the highlighting would move from the center section to the one on its right, then to the left-most section in the bottom row, etc. When the section containing the target location is highlighted, the user selects that section. This is then either followed by further section scanning or by some other strategy (e.g., the Horizontal/Vertical Strategy, the Likely Target Strategy—see the next paragraph, etc.), that allows the user to pick the precise location or object located in that section. When using the Section Strategy with the One-Directional form of the invention, the user moves only in one direction through the offered sections before making a selection.

In a fourth "Likely Target Method," the control software takes on a more active role by analyzing the information shown in the current display and identifying "objects" that are likely targets (e.g., buttons, menu options, desktop icons, etc.). By user preference, all identified likely objects are graphically marked initially (e.g., with overlaid graphic shapes, arrows, numbers, letters, etc.). When the user moves the pointer to the left, a distinctive marker highlights (offers) a likely target before "jumping" to the next likely target. The "linear pattern" used to offer the likely targets can be selected by the user (e.g., generally moving from the left of the display to the right, top to bottom, program to program, etc.). When the actual target is highlighted, the user selects it. If the selected object is one that typically requires a click input (buttons usually are clicked rather than double clicked, dragged, etc.), the click can be automatically applied (by user preference—as in AHF's current mouse emulator program). When using the Likely Target Strategy with the one-directional form of the invention, identified objects are similarly highlighted, but the user can move only in the one preferred direction.

Like the other strategies described to this point, the Likely Target strategy is available as prior art (i.e., without the One- or Two-Directional control mechanisms), and identified options are given a unique identifier which is then either spoken by the user (i.e., utilizing speech recognition) or input with a hardware keyboard. Another similar but unique approach to be included in the invention is after all likely targets are identified, they are presented in a linear "list" format, using their labels or icons. While unnecessary for the existing voice input approach, it could be very useful for the current one-dimensional approach because the user can more intuitively navigate the linear list using One- or Two-Directional control.

The following "Modified Ratcheting Method" is also unique and an important feature of the invention. This method can be combined with any of the strategies discussed above. In all of the previous strategies, it was implied that a movement of distance "X" of the pointer results in a corresponding movement of the mouse cursor of an distance "Y." Similarly, in the "ratcheting" approach described above, it was implied that each successive movements of the pointer in the same direction results in an equal movement of the graphic indicator of location (e.g., cursor, icon, etc.). In the Modified Ratcheting Strategy, a movement in the opposite direction or a move in the opposite direction that returns the user to the starting position is used as a signal to recalibrate the relationship between X and Y, so that a subsequent movement in the preferred direction of distance "X" distance results in a curser/icon movement distance that is "less than Y" (e.g., half Y). This allows the user to move quickly into the general vicinity of the target, move backward to recalibrate, and then more accurately approach the target location). While this approach is most useful for persons using the One-Directional form of the invention, it also can be used with the Two-Directional form.

In a related "Speed Selection Method," an icon is displayed next to the cursor/icon and when its movement is paused, a series of cues (e.g., colors, text) are sequentially provided to indicate differing speeds/accuracies. For example, either initially or after the user pauses, an icon is displayed that shows red for a selected period of time, then yellow, then green. If the user starts/resumes movement in the preferred direction when the icon is red, then the ratio of X to Y is large (more accuracy, less distance), relative to when the icon is yellow (medium accuracy, medium distance), or green (less accuracy, more distance). If there is a large distance to traverse, the user waits for the icon to change green and then moves close to, but short of, the target location and pauses. Then, when the icon turns red the user continues to move (slower but with more accuracy) to the target location.

In the "Combined Scanning Method," traditional scanning is combined with one of the other strategies described above. One of the better examples of this is when one of the one-dimensional approaches is used initially to identify the target location and then the button options are presented in a traditional scanning style. For consistency, the response used to select the click action should be consistent with the selection method used for the one-dimensional strategy being used (e.g., a switch if the a person is using a switch), or consistent with the pointer movement used to select the location (e.g., moving the pointer to the left if that is what the user does to select the location).

Finally, it should be noted that virtually any of the above strategies can be combined to make meaningful interfaces for some users. For example, a user could use the Section Strategy to select the general section of the display and then the Likely Target Strategy to select an object in the selected section. Similarly, an initial Section Strategy might be followed by the Horizontal/Vertical Line Strategy; the initial line selected using the Horizontal/Vertical Line Strategy followed by the Likely Target Strategy (i.e., offer likely targets that the line passes through); etc.

One-Dimensional Software Interface Methods: Emulating Keyboard Character Input Functions. While this section describes how the invention can be used to facilitate the input of characters by selecting keys on a keyboard, the invention is broader than that and includes, for example, selecting an option from a set of options laid out in a multidimensional array including, for example, numbers; computer control functions; words to be inputted, typed, sent, copied, transferred, translated, spoken, etc.; sentences, phrases, or larger sets of character strings to be typed, inputted, spoken, sent, transferred, translated, copied, etc.; actions to be taken for robotic, system, or environmental control; etc.). As with pointer emulation, several interface strategies are available for keyboard input emulation from which a representative sample is presented below. For each general strategy, examples are provided to illustrate how that strategy could be instantiated based on input from both Two- and One-Directional Controls.

In the "Row/Column Method," the row/column approach used in standard scanning is used in combination with the invention. For example, in the Two-Directional form of the invention, the user moves up and down the rows of keys on a standard keyboard (or any other two-dimensional layout of options) and selects the row containing the desired key or option. Next, the user moves left and right through the keys or options in that row before selecting the desired option. In the One-Directional form, the user moves the controller in the preferred direction (e.g., down) which moves the corresponding highlighted row of keys or options downward through the display (the row being offered wraps back to the top after the bottom row is offered). After the desired row is selected, the user again moves the controller downward, but now the options offered (e.g., keys in that row) move from left to right until the user selects the desired key, and that character is inputted to the open application.

In a novel "Actual Linear Keyboard Method," a typically two-dimensional layout of options (e.g., keyboard) is first physically converted to a one-dimensional layout (e.g., all keys on the keyboard are in a single column or row). With the Two-Directional form of the invention, the user moves up and down (if a column) or left and right (if a row) through the keys to make selections. In the One-Directional form, the user moves only left or right or up or down to make selections. To improve performance with this method, it would be best to arrange the options in an order corresponding to their probability of use.

Especially when using the One-Directional form, it would be useful to incorporate the "Ratcheting" or "Modified Ratcheting" methods described above (i.e., because the length of the single row or column can be very long). Also, when using either form, it would be useful to physically remove any options that are highly unlikely. For example, in the keyboard example, after typing an initial letter "Q" it can be determined (by searching a "dictionary" or word list containing the most likely words to be typed or series of selections), that the letters Q, X, Y, etc., are highly unlikely) so those options are physically removed form the one-dimensional keyboard—simplifying the task and reducing the amount of movement required for the next letter. When eliminating unlikely options, the display (e.g., keyboard) could physically be shortened (i.e., so that users are not required to move through the spaces left by the removed options), or the overall layout of the display could be left as is, with unlikely options removed, grayed out, etc. The latter approach has the benefit of leaving options in the same locations, which might help the user visually locate the next option. However, when using that method, movement from option to option is modified in a way such that the user does not spend time moving through the empty spaces created by the removed unlikely options. For example, in an alphabetic linear keyboard offering A and the next letter offered is E (i.e., the B, C, and D keys are not available), then when the user moves from the A to the E it should be a smooth and immediate transition (as if the E key were next to the A key and not four keys away).

Another novel method called the "Transformed Linear Keyboard Method" is similar to the approach described immediately above, but instead of physically arranging the options (keys) in a single row or column, they are left in the more traditional two-dimensional layout but the user's Two- or One-Directional control movements follow a linear path created in the two-dimensional layout. For example, if using the Two-Directional form of the invention, movement is allowed in either direction but, for example, movement to the right results in the options being offered in the top row from left to right, but after the last option on the right side of the top row is offered, the next one offered is the left-most option in the second row. The One-Directional version is similar except that movement (from key to key on the keyboard) is allowed in only one direction. Also, as with the previous method and especially when using the One-Directional form, it would be useful to incorporate the "Ratcheting" or "Modified Ratcheting Strategy" methods because the number of options offered in a linear sequence can be very long. When using either form, it would be useful to offer only options that are likely as described in the previous method.

One of the more promising approaches is anticipated to be the combination of the "List-Based Typing Method" (developed by AHF) and either the Two- or One-Directional forms of this invention. Described in an earlier section, this method by definition creates and offers users a one-dimensional list of possible "Extensions" to the options the user already has inputted, so it is natural for a user to move up or down such a list. If the vertical form of the Actual Linear Keyboard method described above is used to type the first letter and Smart Lists is set to start immediately after the first letter, then the user moves seamlessly from one list format to another. For both the initial linear keyboard and the subsequent Smart Lists, if using the Two-Directional form of the invention, the starting position is half way down the keyboard/list so that the user can move up or down more efficiently. In contrast, if using the One-Directional form, then a starting position at the top of the keyboard/list probably is preferred (so the user can move down the list either alphabetically or from more to less probable options).

Mechanism for Assessing Alternative One-Dimensional Strategies. The target population for this invention is highly heterogeneous. Because of the substantial individual differences among users, it is useful to provide a method for assessing a user to identify and test different candidate behaviors, obtain evidence that a one-dimensional approach is promising, test different One- and Two-Directional controls and corresponding input strategies, determine if a counterforce apparatus is indicated, test and select from different mouse emulation input methods, test and select from different character input methods, etc. In addition, it is useful to provide an automated tool for measuring and characterizing the user's selected movement/control with the goal of applying a transformation/adjustment to the user's responses to improve performance. Consequently, another variation of this invention is its use as an assessment tool with three primary functions: 1) determine if the user is likely to benefit from a Two- or One-Directional input approach relative to using a standard two dimensional pointer and relative to estimates of performance if that person were using scanning approaches, 2) help select the best candidate movement/control combination for that user and 3) determine the best combination of settings, corrections, and apparatus for that user.

In this assessment procedure, these three functions are completed in four phases which are most clearly illustrated in the context of an example. A potential user is unable to use a conventional pointer to control a computer or uses it very poorly, so this assessment procedure is used to help determine if this person is likely to benefit from either general form of the invention, and if so, which behavior, control, form of the invention, settings, control method, etc. are likely to be the best for this person.

In the first part of phase 1, the assessment program solicits information from the user and any rehabilitation professionals or family familiar with the user's abilities. A number of queries are presented about the perceived ability of the user to use hands, feet, fingers, head, eyebrow, puff on a straw, etc. For each candidate behavior, the participants are asked to estimate the amount of control the user has when making that response. Through such ratings and forced paired comparisons, the program produces a prioritized list of the more promising candidate generic behaviors and corresponding hardware controls that should be investigated for that user. Based on those initial estimates, the best available combination of movement and controller are combined and the user is given a series of trials in which the task is to reposition a mouse cursor from an original starting location at the center of the display to a "target" that appears left, right, above, or below the starting position. During this task, control of the cursor is either a) limited to one dimension (e.g., if the target is up, then up/down control movement results in only up/down cursor movements and the program disregards any left/right movement) or b) allowed to move independently in two dimensions (i.e., standard pointer control—to provide an estimate of performance with a standard pointer and a method of estimating if there is likely to be an advantage in using a One- or Two-Directional input method).

For movements where only one dimension is possible (e.g., puffing, eyebrow movement, some psychophysiological responses, etc.), behavior in that one dimension is used to obtain data for both up/down and left/right cursor movement. On each trial, the user's speed and accuracy of repositioning the cursor are measured and stored. At the end of each candidate combination, the user is asked to rate perceived ease of use, amount of fatigue, preference, etc. After a rest period, the next highest candidate behavior/control combination is tested using the same procedure. For each such test, the program 1) collapses both the performance and subjective data and derives a single score for that combination, 2) determines which dimension yielded the most precise control, 3) determines which direction yielded the most precise control, 4) estimates whether the difference in performance (time and accuracy) between the best Two-Directional method and the best One-Directional method is statistically significant, and 5) estimates the performance difference between the tested Two- or One-Directional method and performance on the same task a) if that individual were using a standard pointer with control in two dimensions (based on that user's performance), and b) if that individual were using a more basic switch scanning approach (based on estimates of that user's speed/accuracy in using a single switch and simulation of comparable scanning tasks). Results for the different methods tested are summarized in a report.

At this stage, data are available to help with the decision about whether a One- or Two-Directional input method is promising for this user. If promising, then data also are available to help with the decision about a) which behavior/control combination is the most promising for this user and b) for that combination, whether a Two- or One-Directional method is more promising (if there is no difference, then the Two-Directional method should be pursued first because it is potentially much faster).

If there is support for a one-dimensional approach, then the user enters the second stage of assessment. In this phase, the person uses the most promising behavior/control combination to perform tasks similar to those performed in the first phase except here the goal is to determine finer settings to the control system. For example, if the best combination for this person involves using a conventional mouse by moving it right and left, then the user is asked to perform trials in which her/his arm is placed in a comfortable neutral starting position and then moves the mouse to the left at a speed/distance that is comfortable. This is performed with no corresponding feedback about the movement of a cursor. The user then repeats that task except by moving the arm to the right. Several such trials are conducted for both directions; on all trials, time and distance from the start until the end of the movement are recorded and stored for both the initial response (moving from a neutral location to the left) and the second response of moving back to the neutral starting position. On each trial the range of movement and speed of movement for both leftward and rightward moves are recorded and consistent patterns in the relationship between time and distance are sought in the resulting data. One outcome from this procedure is an initial estimate of the initial "gain" settings to use for that subject for each direction. Gain is used here to depict the relationship between the user's actual movements and the corresponding distance the cursor moves on the display. In general, the goal is to allow a user to comfortably traverse the maximum distance as appropriate for that approach (e.g., a person using the Two-Directional form should be able to comfortably move the cursor from the center of the display to both edges—if possible). In addition, the movement data from these trials are combined with data from the earlier trials to further evaluate 1) which general form of the invention is likely to be better for this user (e.g., if a user has considerable range of motion in one direction but less range in the other, then the One-Directional form of the invention is indicated); 2) whether use of a constraining apparatus for the pointer is indicated (as appropriate, e.g., a person moving to the left has excessive and random vertical movement which might be reduced by an apparatus that limited the mouse movement to only left and right); and 3) whether use of a Counterforce Apparatus is indicated (e.g., if movement in one direction is significantly faster, more controlled, and more "smooth" than when returning to the neutral position or moving in the opposite direction).

In the third phase, the person being assessed is asked to use the selected movement/controller with all the settings/adjustments/apparatus applied—as determined in the second phase. Trials are presented similar to those in the first phase, except only the selected movement(s) are made and the targets appear at different distances ranging from very close to the starting point to very distant. During each trial, the speed, accuracy, and "profile" of the movement is measured and recorded (i.e., the relationship between distance traveled and time—e.g., one user might accelerate quickly, maintain a constant velocity, and stop suddenly; another user might accelerate until half way there and then decelerate; etc.). Data from these trials are used to determine if adjustments need to be made with regard to the relationship between the user's movement and the corresponding cursor movement. For example, if a user demonstrates good speed and accuracy to the target regardless of distance, then no such adjustments are indicated. If a user shows general control moving to the target but considerable "jitter" is detected, then a smoothing function can be applied (e.g., a floating average of the last "X" locations is used to show the cursor location instead of each separate location—as X increases, more smoothing results). If a user demonstrates a profile such that there is a consistent pattern of significant initial acceleration followed by more constant and controlled velocity, then a "smart" function can be applied to the movement that has the net effect of reducing the initial more erratic movement while not affecting the later more controlled movement, resulting in a more constant cursor velocity at all stages (in this example, the initial spike in acceleration is dampened). If the person is using the One-Directional form of the invention and it is determined that only relatively small movements are possible and that accuracy significantly degrades when the corresponding high gain is applied, then the Ratcheting approach is indicated and should be introduced and tested. Finally, if the person is using Ratcheting and it is determined that accuracy is much greater when moving a short distance to a target than when moving a long distance, then the Modified Ratcheting approach is indicated and should be introduced and tested.

During the fourth phase, with all adjustments identified in the earlier phases applied, the user is introduced to simulated two-dimensional control activities and allowed to try different strategies and methods described above for emulating mouse and typing activities. The emphasis here is on exposing the user to different strategies available and, while performance data are collected, more weight is given to the user's personal preference. For example, the user's preferred relationship of his/her movement to the cursor movement in the orthogonal direction must be determined (e.g., if moving the mouse left and right, then when selecting the vertical location, should moving the mouse to the left produce an upward or downward movement). The goals for the fourth phase are to assist the user select the mouse and keyboard emulation methods that are the best for that user, insure that all corresponding decisions about relevant system settings are presented and addressed, and insure that the user/caretaker is familiar with how to make changes to those settings.

Summary. There are two general forms of the invention. Both forms provide a computer user an alternative general method for performing both mouse emulation functions, and for making selections from a multidimensional layout of options, such as inputting text as usually performed with a hardware or on-screen keyboard. Both forms do so by converting the standard two-dimensional control process to one dimension. In the first general form of the invention called Two-Directional Control, the user operates a control apparatus in either of two orthogonal directions along the same single dimension (e.g., up or down; left or right; more pressure—puff on straw or less pressure—sip on straw; move closer to a proximity sensor or move away from a proximity sensor; increase psychophysiological activity or decrease psychophysiological activity; etc.). In the second general form of the invention called One-Directional Control, the user operates a control in only one direction along a single dimension (e.g., upward movement affects the control mechanism, downward movement is ignored; leftward movement affects the control mechanism, rightward movement is ignored; a puff on straw affects the control mechanism, a sip on the straw is ignored; an increase in psychophysiological activity affects the control mechanism, a decrease in activity is ignored; etc.). For each general method, a number of control strategies (methods for converting control activities to useful on-screen options) are included as variations of input control methods which can complement the two general forms. In a third form of the invention, an apparatus is added to facilitate the use of commercially available pointers (e.g., mouse) by stabilizing and limiting their movement to one dimension. An apparatus and method are described that allow existing sensors and transducers to be utilized with the new one-dimensional interface approach. Another apparatus is described which provides a counterforce to augment those muscle groups which are antagonistic to those muscles producing the preferred movement. The best example of its potential value of that apparatus is for the One-Directional form of the invention, in which a user has adequate control in one direction (e.g., moving a control to the left) but significantly less control, strength, or coordination in the antagonistic muscle groups (moving the control back to the right), so the apparatus is used to apply a rightward counterforce to help the user return to the starting position. To further complement the one-dimensional interface method and to help ensure that it is applied correctly and appropriately, an assessment process is described that is designed to help determine whether a specific user is a good candidate for a one-dimensional control, which general form is likely to be better, what settings should be made for the resulting interface, whether a constraining or counterforce apparatus are indicated, whether raw data from the controller should be mathematically transformed/adjusted to produce better performance, and which control input strategy and method should be used for mouse and keyboard emulation.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A process that provides a computer user wanting to perform standard point-and-click activities usually requiring the use of a mouse or other pointing device to first identify the location of the activity on a computer's two-dimensional display and then perform a standard clicking activity, an alternative method of identifying the location of a desired target visible display element from a plurality of possible such visible display elements visible on the said display comprising the steps of:

a) providing the user a visible two-dimensional visual display;

b) providing on said two-dimensional visual display a matrix of visible display elements comprising two or more horizontal rows with each row containing two or more visible display elements, and two or more vertical columns with each column containing two or more visual display elements;

c) providing a mechanism that displays a visible current horizontal location indicator on said two-dimensional visual display which indicates the horizontal location of the column of display elements currently being offered to the user for selection, and helping the user discriminate those visible display elements currently being offered for selection from those display elements not currently being offered for selection;

d) providing the user an input or control device sensing variations in direction and speed along one selected measurable dimension of the user's behavior while actively performing a voluntary continuously variable response;

e) providing a mechanism which transduces the sensed variations in direction and speed into control-device output values which are monotonically related to said variations in direction and speed;

f) providing a mechanism that ignores decreasing values in the control-device output values from said input or control device and transduces increasing values in the control-device output values from said input or control device into corresponding and monotonically related rightward changes in the column value and corresponding horizontal location associated with the said current horizontal location indicator displayed on the two-dimensional visual display so that behavioral changes in the user's response are only capable of moving the current horizontal location indicator from left to right when moving among the plurality of columns, eventually in the direction of the column containing the target visible display element;

g) providing a mechanism which allows the relationship among changes in the said control-device output increasing values and the corresponding transduced changes in the location of the said current horizontal location indicator to be adjusted;

h) providing a mechanism wherein said current horizontal location indicator is allowed to wrap or be repositioned from the rightmost column to the leftmost column when the current horizontal location indicator reaches the extreme right side of the display and the user's behavioral response continues to generate increasing values;

i) providing a mechanism that allows the user to select the column currently being offered for selection as indicated by the current horizontal location indicator;

j) providing a mechanism which, following selection of the desired column, automatically prevents further horizontal movement in the current horizontal location indicator, displays a current vertical location indicator which indicates a row currently being offered for selection, and alters the use of the control-device output increasing values corresponding to the same selected measurable dimension of the user's behavior so that the control-device output increasing values now are transduced to corresponding and monotonically related upward changes in the row being offered for selection as indicated by the current vertical location indicator, providing the user feedback when moving upward among the plurality of rows, eventually in the direction of the row containing the target visible display element;

k) providing a mechanism which allows the relationship among changes in the control-device output increasing values and the corresponding transduced changes in the location of the said current vertical location indicator to be adjusted;

l) providing a mechanism wherein said current vertical location indicator is allowed to wrap or be repositioned from the topmost row to the bottommost row when the current vertical location indicator reaches the extreme top row of the display and the user's behavioral response continues to generate increasing values;

m) providing a mechanism that allows the user to select the row currently being offered for selection as indicated by the current vertical location indicator, thereby identifying a single visible display element and thereby distinguishing that element from the plurality of visible display elements presented on the visual display; and n) providing a mechanism that allows the user to select from among different standard clicking activities which are able to be performed at the identified visible display element.

2. The process of claim 1, wherein said visible display element is defined as an individual picture element or pixel and represents the smallest visible component on a two-dimensional visual display.

3. The process of claim 1, wherein said mechanism that allows the user to select the column currently being offered or said mechanism that allows the user to select the row currently being offered is a switch.

4. The process of claim 1, wherein said visible display element is defined by a group of contiguous picture elements creating an area larger than an individual picture element, which is identified by a pictorial or text label, and which is associated with a corresponding computer action.

5. The process of claim 1, wherein said input or control device is a mouse or other pointing device, and an external apparatus is provided which physically limits the normally two-dimensional movement associated with said pointing device to one dimension in order to further assist the user when trying to perform voluntary movements to one dimension.

6. The process of claim 1, wherein said control device is an electrophysiological apparatus.

7. A process that provides a computer user wanting to perform standard point-and-click activities usually requiring the use of a mouse or other control device to first identify the location of the activity on a computer's two-dimensional display and then perform a standard clicking activity, an alternative method of identifying the location of a desired target visible display element from a plurality of possible such visual display elements visible on the display and then executing the desired clicking activity comprising the steps of:

a) providing the user a visible two-dimensional visual display;

b) providing on said two-dimensional visual display a matrix of visible display elements comprising two or more horizontal rows with each row containing two or more visible display elements, and two or more vertical columns with each column containing two or more visible display elements;

c) providing the user a control device sensing variations in direction and speed along one selected measurable dimension of the user's behavior while actively performing a voluntary continuously variable response;

d) providing a mechanism which transduces the sensed variations in direction and speed into control-device output values which are monotonically related to said variations in direction and speed;

e) providing a mechanism that indicates on said two-dimensional visual display the user's current horizontal location by providing a vertical columnar display that indicates all display elements included in the column containing the display element associated with the current horizontal location, thereby helping the user discriminate the plurality of visible display elements currently being offered for selection from the plurality of display elements not currently being offered for selection;

f) providing a mechanism that transduces said control-device output values from said control device into corresponding and monotonically related changes in the horizontal location of the said current vertical columnar display on the two-dimensional visual display so that it continuously indicates the currently offered column of display elements and provides the user feedback when moving said control device from right to left or from left to right among the plurality of columns in the direction of the column containing the target display element;

g) providing a mechanism which allows the relationship among changes in the said control-device output values and the corresponding transduced changes in the location of the said vertical columnar display to be adjusted so the user is able to traverse leftward and rightward among all possible columns on the visual display;

h) providing a mechanism which, for all possible horizontal display elements included in said matrix of visible display elements, allows the user to select the column currently being offered for selection as indicated by said vertical columnar display;

i) providing a mechanism which, following selection of the desired column, automatically prevents further horizontal movement in the current vertical columnar display, displays a current vertical location indicator which indicates a row currently being offered for selection, and alters the use of the control-device output values corresponding to the same one selected measurable dimension of the user's behavior so that the control-device output values now are transduced to corresponding and monotonically related changes in the row being offered for selection as indicated by said current vertical location indicator, thereby providing the user feedback when moving upward or downward among the plurality of rows in the direction of the row containing the target visible display element;

j) providing a mechanism which allows the relationship among changes in the said control-device output values and the corresponding transduced changes in the location of the said vertical location indicator to be adjusted so the user is able to traverse upward and downward among all possible rows in the selected column on the display;

k) providing a mechanism that allows the user to select the row currently being offered for selection as indicated by the current vertical location indicator, thereby identifying a single visible display element and thereby distinguishing that element from the plurality of other visible display elements presented on the visual display;

l) presenting a visible horizontal, one-dimensional click menu containing common clicking activity options immediately after the user has identified the target display element of the point-and-click activity;

m) providing a mechanism for displaying a current clicking activity option indicator which can be individually visually associated to each clicking activity option displayed in said one-dimensional click menu and which signals the user that the associated clicking activity option is the only clicking activity option currently available for selection;

n) providing a mechanism that automatically prevents further vertical movement in the current vertical location indicator, alters the use of the control-device output values so that they now are transduced to corresponding and monotonically related horizontal changes in the location of said clicking activity option indicator in said one-dimensional click menu, thereby providing visual feedback while the user continues to move in the one selected measurable dimension to a menu option that matches the desired clicking action;

o) providing a mechanism which allows the relationship among changes in the said control-device output values and the corresponding transduced changes in the location of the said current menu option indicator to be adjusted so the user is able to more accurately traverse leftward and rightward among all possible menu options in said one-dimensional click menu;

p) providing a mechanism that allows the user to select the clicking activity option currently being offered for selection as indicated by the clicking activity option indicator;

q) providing a mechanism for executing the selected clicking activity at the identified display element; and r) providing a mechanism for resetting the procedure, allowing the user to proceed to the next point-and-click activity.

8. The process of claim 7, wherein said vertical columnar display is allowed to wrap such that, in the event the user behaves in a manner that moves the vertical columnar display rightward to the point that it reaches the extreme right column, and the user continues to behave in that manner producing rightward movement, then the vertical columnar display is relocated to the extreme left column of the display matrix and continues its rightward movement from there, and similarly, in the event the user behaves in a manner that moves the vertical columnar display leftward to the point that it reaches the extreme left column, and the user continues to behave in that manner producing leftward movement, then the vertical columnar display is relocated to the extreme right column of the display matrix and continues its leftward movement from there.

9. The process of claim 7, wherein said current vertical location indicator is allowed to wrap such, that in the event the user behaves in a manner that moves the current vertical location indicator upward to the point that it reaches the extreme top row, and the user continues to behave in that manner producing upward movement, then the current vertical location indicator is relocated to the extreme bottom row of display elements and continues its upward movement from there, and similarly, in the event the user behaves in a manner that moves the current vertical location indicator downward to the point that it reaches the extreme bottom row, and the user continues to behave in that manner producing downward movement, then the current vertical location indicator is relocated to the extreme top row of display elements and continues its downward movement from there.

10. The process of claim 7, wherein said vertical columnar display is not allowed to wrap such that, in the event the user behaves in a manner that moves the vertical columnar display rightward to the point that it reaches the extreme right column, and the user continues to behave in that manner producing rightward movement, then the vertical columnar display remains located at the extreme right column, and similarly, in the event the user behaves in a manner that moves the vertical columnar display leftward to the point that it reaches the extreme left column, and the user continues to behave in that manner producing leftward movement, then the vertical columnar display remains located at the extreme left column.

11. The process of claim 7, wherein said current vertical location indicator is not allowed to wrap such that, in the event the user behaves in a manner that moves the current vertical location indicator upward to the point that it reaches the extreme top row, and the user continues to behave in that manner usually producing upward movement, then the current vertical location indicator remains located at that top row, and similarly, in the event the user behaves in a manner that moves the current vertical location indicator downward to the point that it reaches the extreme bottom row, and the user continues to behave in that manner usually producing downward movement, then the current vertical location indicator remains located at that bottom row.

12. The process of claim 7, wherein said visible display element is defined as an individual picture element or pixel and represents the smallest visible component on a two-dimensional visual display.

13. The process of claim 7, wherein said visible display element is defined by a group of contiguous picture elements creating an area larger than an individual picture element, which is identified by a pictorial or text label, and which is associated with a corresponding computer action.

14. The process of claim 7, wherein said mechanism that allows the user to select the column currently being offered, said mechanism that allows the user to select the row currently being offered, or said mechanism that allows the user to select the clicking action currently being offered, is a switch.

15. The process of claim 7, wherein said control device is a mouse or other pointing device.

16. process of claim 7, wherein said control device is a pointing device, and an external apparatus is provided which physically limits the normally two-dimensional movement associated with said pointing device to one dimension in order to further assist the user when trying to perform voluntary movements to one dimension.

17. The process of claim 7, wherein said control device only senses variations in direction and speed along the one selected measurable dimension of the user's behavior while actively performing a voluntary continuously variable response.

18. The process of claim 7, wherein said control device is an electrophysiological apparatus.

19. An apparatus that provides a computer user wanting to perform standard point-and-click activities usually requiring the use of a mouse or other pointing device to first identify the location of the activity on a computer's two-dimensional display and then perform a standard clicking activity, an apparatus that identifies the location of a desired target visible display element from a plurality of possible such visible display elements visible on the said display comprising:

a) a visible two-dimensional visual display;

b) a matrix of visible display elements on said two dimensional visual display comprising two or more horizontal rows with each row containing two or more visible display elements, and two or more vertical columns with each column containing two or more visual display elements;

c) a mechanism that displays a visible current horizontal location indicator on said two-dimensional visual display which indicates the horizontal location of the column of display elements currently being offered to the user for selection, and helping the user discriminate those visible display elements currently being offered for selection from those display elements not currently being offered for selection;

d) a control device sensing variations in direction and speed along one selected measurable dimension of the user's behavior while actively performing a voluntary continuously variable response;

e) a mechanism which transduces the sensed variations in direction and speed into control-device output values which are monotonically related to said variations in direction and speed;

f) a mechanism that ignores decreasing values in the control-device output values from said input or control device and transduces increasing values in the control-device output values from said input or control device into corresponding and monotonically related rightward changes in the column value and corresponding horizontal location associated with the said current horizontal location indicator displayed on the two-dimensional visual display so that behavioral changes in the user's response are only capable of moving the current horizontal location indicator from left to right when moving among the plurality of columns, eventually in the direction of the column containing the target visible display element;

g) a mechanism which allows the relationship among changes in the said control-device output increasing values and the corresponding transduced changes in the location of the said current horizontal location indicator to be adjusted;

h) a mechanism wherein said current horizontal location indicator is allowed to wrap or be repositioned from the rightmost column to the leftmost column when the current horizontal location indicator reaches the extreme right side of the display and the user's behavioral response continues to generate increasing values;

i) a mechanism that allows the user to select the column currently being offered for selection as indicated by the current horizontal location indicator;

j) a mechanism which, following selection of the desired column, automatically prevents further horizontal movement in the current horizontal location indicator, displays a current vertical location indicator which indicates a row currently being offered for selection, and alters the use of the control-device output increasing values corresponding to the same selected measurable dimension of the user's behavior so that the control-device output increasing values now are transduced to corresponding and monotonically related upward changes in the row being offered for selection as indicated by the current vertical location indicator, providing the user feedback when moving upward among the plurality of rows, eventually in the direction of the row containing the target visible display element;

k) a mechanism which allows the relationship among changes in the control-device output increasing values and the corresponding transduced changes in the location of the said current vertical location indicator to be adjusted;

l) a mechanism wherein said current vertical location indicator is allowed to wrap or be repositioned from the topmost row to the bottommost row when the current vertical location indicator reaches the extreme top row of the display and the user's behavioral response continues to generate increasing values;

m) a mechanism that allows the user to select the row currently being offered for selection as indicated by the current vertical location indicator, thereby identifying a single visible display element and thereby distinguishing that element from the plurality of visible display elements presented on the visual display; and n) a mechanism that allows the user to select from among different standard clicking activities which are able to be performed at the identified visible display element.

20. The apparatus of claim 19, wherein said visible display element is defined as an individual picture element or pixel and represents the smallest visible component on a two-dimensional visual display.

21. The apparatus of claim 19, wherein said mechanism that allows the user to select the column currently being offered or said mechanism that allows the user to select the row currently being offered, is a switch.

22. The apparatus of claim 19, wherein said visible display element is defined by a group of contiguous picture elements creating an area larger than an individual picture element, which is identified by a pictorial or text label, and which is associated with a corresponding computer action.

23. The apparatus of claim 19, wherein said control device is a mouse or other pointing device, and an external apparatus is provided which physically limits the normally two-dimensional movement associated with said pointing device to one dimension in order to further assist the user when trying to perform voluntary movements to one dimension.

24. The apparatus of claim 19, wherein said control device is an electrophysiological apparatus.

25. An apparatus that provides a computer user wanting to perform standard point-and-click activities usually requiring the use of a mouse or other control device to first identify the location of the activity on a computer's two-dimensional display and then perform a standard clicking activity, an apparatus that identifies the location of a desired target visible display element from a plurality of possible such visual display elements visible on the display and then executing the desired clicking activity comprising:

a) a visible two-dimensional visual display;

b) a matrix of visible display elements on said two-dimensional visual display comprising two or more horizontal rows with each row containing two or more visible display elements, and two or more vertical columns with each column containing two or more visible display elements;

c) a control device sensing variations in direction and speed along one selected measurable dimension of the user's behavior while actively performing a voluntary continuously variable response;

d) a mechanism which transduces the sensed variations in direction and speed into control-device output values which are monotonically related to said variations in direction and speed;

e) a mechanism that indicates on said two-dimensional visual display the user's current horizontal location by providing a vertical columnar display that indicates all display elements included in the column containing the display element associated with the current horizontal location, thereby helping the user discriminate the plurality of visible display elements currently being offered for selection from the plurality of display elements not currently being offered for selection;

f) a mechanism that transduces said control-device output values from said control device into corresponding and monotonically related changes in the horizontal location of the said current vertical columnar display on the two-dimensional visual display so that it continuously indicates the currently offered column of display elements and provides the user feedback when moving said control device from right to left or from left to right among the plurality of columns in the direction of the column containing the target display element;

g) a mechanism which allows the relationship among changes in the said control-device output values and the corresponding transduced changes in the location of the said vertical columnar display to be adjusted so the user is able to traverse leftward and rightward among all possible columns on the visual display;

h) a mechanism which, for all possible horizontal display elements included in said matrix of visible display elements, allows the user to select the column currently being offered for selection as indicated by said vertical columnar display;

i) a mechanism which, following selection of the desired column, automatically prevents further horizontal movement in the current vertical columnar display, displays a current vertical location indicator which indicates a row currently being offered for selection, and alters the use of the control-device output values corresponding to the same one selected measurable dimension of the user's behavior so that the control-device output values now are transduced to corresponding and monotonically related changes in the row being offered for selection as indicated by said current vertical location indicator, thereby providing the user feedback when moving upward or downward among the plurality of rows in the direction of the row containing the target visible display element;

j) a mechanism which allows the relationship among changes in the said control-device output values and the corresponding transduced changes in the location of the said vertical location indicator to be adjusted so the user is able to traverse upward and downward among all possible rows in the selected column on the display;

k) a mechanism that allows the user to select the row currently being offered for selection as indicated by the current vertical location indicator, thereby identifying a single visible display element and thereby distinguishing that element from the plurality of other visible display elements presented on the visual display;

l) a mechanism that presents a visible horizontal, one-dimensional click menu containing common clicking activity options immediately after the user has identified the target display element of the point-and-click activity;

m) a mechanism for displaying a current clicking activity option indicator which can be individually visually associated to each clicking activity option displayed in said one-dimensional click menu and which signals the user that the associated clicking activity option is the only clicking activity option currently available for selection;

n) a mechanism that automatically prevents further vertical movement in the current vertical location indicator, alters the use of the control-device output values so that they now are transduced to corresponding and monotonically related horizontal changes in the location of said clicking activity option indicator in said one-dimensional click menu, thereby providing visual feedback while the user continues to move in the one selected measurable dimension to a menu option that matches the desired clicking action;

o) a mechanism which allows the relationship among changes in the said control-device output values and the corresponding transduced changes in the location of the said current menu option indicator to be adjusted so the user is able to more accurately traverse leftward and rightward among all possible menu options in said one-dimensional click menu;

p) a mechanism that allows the user to select the clicking activity option currently being offered for selection as indicated by the clicking activity option indicator;

q) a mechanism for executing the selected clicking activity at the identified display element; and r) a mechanism for resetting the procedure, allowing the user to proceed to the next point-and-click activity.

26. The apparatus of claim 25, wherein said vertical columnar display is allowed to wrap such that, in the event the user behaves in a manner that moves the vertical columnar display rightward to the point that it reaches the extreme right column, and the user continues to behave in that manner producing rightward movement, then the vertical columnar display is relocated to the extreme left column of the display matrix and continues its rightward movement from there, and similarly, in the event the user behaves in a manner that moves the vertical columnar display leftward to the point that it reaches the extreme left column, and the user continues to behave in that manner producing leftward movement, then the vertical columnar display is relocated to the extreme right column of the display matrix and continues its leftward movement from there.

27. The apparatus of claim 25, wherein said current vertical location indicator is allowed to wrap such, that in the event the user behaves in a manner that moves the current vertical location indicator upward to the point that it reaches the extreme top row, and the user continues to behave in that manner producing upward movement, then the current vertical location indicator is relocated to the extreme bottom row of display elements and continues its upward movement from there, and similarly, in the event the user behaves in a manner that moves the current vertical location indicator downward to the point that it reaches the extreme bottom row, and the user continues to behave in that manner producing downward movement, then the current vertical location indicator is relocated to the extreme top row of display elements and continues its downward movement from there.

28. The apparatus of claim 25, wherein said vertical columnar display is not allowed to wrap such that, in the event the user behaves in a manner that moves the vertical columnar display rightward to the point that it reaches the extreme right column, and the user continues to behave in that manner producing rightward movement, then the vertical columnar display remains located at the extreme right column, and similarly, in the event the user behaves in a manner that moves the vertical columnar display leftward to the point that it reaches the extreme left column, and the user continues to behave in that manner producing leftward movement, then the vertical columnar display remains located at the extreme left column.

29. The apparatus of claim 25, wherein said current vertical location indicator is not allowed to wrap such that, in the event the user behaves in a manner that moves the current vertical location indicator upward to the point that it reaches the extreme top row, and the user continues to behave in that manner usually producing upward movement, then the current vertical location indicator remains located at that top row, and similarly, in the event the user behaves in a manner that moves the current vertical location indicator downward to the point that it reaches the extreme bottom row, and the user continues to behave in that manner usually producing downward movement, then the current vertical location indicator remains located at that bottom row.

30. The apparatus of claim 25, wherein said visible display element is defined as an individual picture element or pixel and represents the smallest visible component on a two-dimensional visual display.

31. The apparatus of claim 25, wherein said visible display element is defined by a group of contiguous picture elements creating an area larger than an individual picture element, which is identified by a pictorial or text label, and which is associated with a corresponding computer action.

32. The apparatus of claim 25, wherein said mechanism that allows the user to select the column currently being offered, said mechanism that allows the user to select the row currently being offered, or said mechanism that allows the user to select the clicking action currently being offered, is a switch.

33. The apparatus of claim 25, wherein said control device is a mouse or other pointing device.

34. The apparatus of claim 25, wherein said control device is a pointing device, and an external apparatus is provided which physically limits the normally two-dimensional movement associated with said pointing device to one dimension in order to further assist the user when trying to perform voluntary movements to one dimension.

35. The apparatus of claim 25, wherein said control device only senses variations in direction and speed along the one selected measurable dimension of the user's behavior while actively performing a voluntary continuously variable response.

36. The apparatus of claim 25, wherein said control device is an electrophysiological apparatus.

* * * * *